US012034278B2

(12) United States Patent
Koenig

(10) Patent No.: US 12,034,278 B2
(45) Date of Patent: Jul. 9, 2024

(54) SPARK PLUG, SPARK PLUG ELECTRODE, AND METHOD OF MANUFACTURING THE SAME

(71) Applicant: FEDERAL-MOGUL IGNITION GMBH, Neuhaus-Schierschnitz (DE)

(72) Inventor: Daniel Koenig, Rodental (DE)

(73) Assignee: FEDERAL-MOGUL IGNITION GMBH, Neuhaus-Schierschnitz (DE)

( * ) Notice: Subject to any disclaimer, the term of this patent is extended or adjusted under 35 U.S.C. 154(b) by 0 days.

(21) Appl. No.: 18/382,746

(22) Filed: Oct. 23, 2023

(65) Prior Publication Data

US 2024/0047949 A1 Feb. 8, 2024

Related U.S. Application Data

(63) Continuation of application No. 18/127,488, filed on Mar. 28, 2023, now Pat. No. 11,831,130.

(60) Provisional application No. 63/324,984, filed on Mar. 29, 2022.

(51) Int. Cl.

| | |
|---|---|
| ***H01T 21/02*** | (2006.01) |
| ***H01T 13/32*** | (2006.01) |
| ***H01T 13/39*** | (2006.01) |
| ***H01T 13/46*** | (2006.01) |

(52) U.S. Cl.

CPC ........... *H01T 13/462* (2013.01); *H01T 13/32* (2013.01); *H01T 13/39* (2013.01); *H01T 21/02* (2013.01)

(58) Field of Classification Search

CPC ........ H01T 13/462; H01T 13/32; H01T 13/39

USPC .......................................................... 313/123

See application file for complete search history.

(56) References Cited

U.S. PATENT DOCUMENTS

| | | | |
|---|---|---|---|
| 3,119,944 A | 1/1964 | Lentz et al. |
| 4,786,267 A | 11/1988 | Toya et al. |
| 5,273,474 A | 12/1993 | Oshima et al. |
| 5,347,193 A | 9/1994 | Oshima et al. |
| 5,461,276 A | 10/1995 | Matsutani et al. |

(Continued)

FOREIGN PATENT DOCUMENTS

| | | |
|---|---|---|
| CN | 103094842 A | 5/2013 |
| CN | 103457160 A | 12/2013 |

(Continued)

OTHER PUBLICATIONS

US 10,576,577 B2, 06/2007, Didier Le Breis et al. (withdrawn)

(Continued)

*Primary Examiner* — Christopher M Raabe

(74) *Attorney, Agent, or Firm* — REISING ETHINGTON P.C.

(57) ABSTRACT

A spark plug electrode with one or more electrode tip(s) formed on one or more electrode base(s) using an additive manufacturing process, such as a powder bed fusion technique, such that each electrode tip overhangs an edge of a corresponding electrode base. The spark plug electrode may be a center electrode, a ground electrode, or an annular ground electrode and can be provided according to a number of different configurations. Each electrode tip includes a precious metal-based material, such as an iridium- or platinum-based alloy, and a plurality of laser deposition layers, and each electrode tip can be secured to an electrode base with a weldless joint. An additive manufacturing process is also provided.

21 Claims, 13 Drawing Sheets

(56) References Cited

U.S. PATENT DOCUMENTS

| | | | |
|---|---|---|---|
| 5,510,667 A | 4/1996 | Loeffler et al. | |
| 5,866,973 A | 2/1999 | Kagawa et al. | |
| 5,977,695 A | 11/1999 | Osamura et al. | |
| 6,621,198 B2 | 9/2003 | Kanao et al. | |
| 7,385,339 B2 | 6/2008 | Lineton et al. | |
| 7,385,355 B2 | 6/2008 | Toshiaki et al. | |
| 7,521,850 B2 | 4/2009 | Lykowski | |
| 7,569,979 B2 | 8/2009 | Lykowsi et al. | |
| 7,666,047 B2 | 2/2010 | Suzuki et al. | |
| 7,740,683 B2 | 6/2010 | Thorsson et al. | |
| 7,795,790 B2 | 9/2010 | Lineton | |
| 7,808,165 B2 | 10/2010 | Kowalski | |
| 7,891,095 B2 | 2/2011 | Jonsson et al. | |
| 8,348,709 B1 | 1/2013 | Passman et al. | |
| 8,354,782 B2 | 1/2013 | Sakayanagi et al. | |
| 8,427,038 B2 | 4/2013 | Taido et al. | |
| 8,841,828 B2 | 9/2014 | Igarashi et al. | |
| 8,896,193 B2 | 11/2014 | Kataoka | |
| 8,926,879 B2 | 1/2015 | Vagt et al. | |
| 8,987,981 B2 | 3/2015 | Imai | |
| 9,077,158 B2 | 7/2015 | Murayama et al. | |
| 9,130,358 B2 | 9/2015 | Ma | |
| 9,219,351 B2 | 12/2015 | Walker, Jr. | |
| 9,636,869 B2 | 5/2017 | Kroll et al. | |
| 9,662,840 B1 | 5/2017 | Buller et al. | |
| 9,698,576 B2 | 7/2017 | Niessner et al. | |
| 9,713,843 B2 | 7/2017 | Snyder et al. | |
| 9,739,192 B2 | 8/2017 | Willi | |
| 9,800,023 B2 | 10/2017 | Niessner et al. | |
| 9,806,500 B2 | 10/2017 | Sakairi et al. | |
| 9,843,045 B2 | 12/2017 | Yuge et al. | |
| 9,853,423 B1 | 12/2017 | Sumoyama et al. | |
| 9,871,351 B2 | 1/2018 | Thomas et al. | |
| 9,893,361 B1 | 2/2018 | Jaker et al. | |
| 9,948,069 B2 | 4/2018 | Segawa et al. | |
| 9,991,680 B2 | 6/2018 | Ikeda et al. | |
| 10,008,832 B2 | 6/2018 | Quest et al. | |
| 10,259,163 B2 | 4/2019 | Eilken et al. | |
| 10,328,526 B2 | 6/2019 | Ols et al. | |
| 10,415,122 B2 | 9/2019 | Barthelemy et al. | |
| 10,472,698 B2 | 11/2019 | Zeniya et al. | |
| 10,539,255 B2 | 1/2020 | Kroll et al. | |
| 10,559,944 B2 | 2/2020 | Kaji et al. | |
| 10,744,590 B2 | 8/2020 | Maier et al. | |
| 10,897,123 B2 | 1/2021 | Abe | |
| 10,913,257 B2 | 2/2021 | Coupland et al. | |
| 11,189,993 B2 | 11/2021 | Grabner et al. | |
| 2001/0013746 A1 | 8/2001 | Kanao et al. | |
| 2001/0025617 A1 | 10/2001 | Kanao | |
| 2004/0100178 A1 | 5/2004 | Kanao et al. | |
| 2004/0129683 A1 | 7/2004 | Torii et al. | |
| 2004/0140745 A1 | 7/2004 | Hrastnik | |
| 2006/0028106 A1 | 2/2006 | Lineton et al. | |
| 2007/0013126 A1 | 6/2007 | Didier | |
| 2007/0132354 A1 | 6/2007 | Scott et al. | |
| 2007/0236123 A1 | 10/2007 | Lykowski et al. | |
| 2009/0277540 A1 | 11/2009 | Abraham | |
| 2012/0194056 A1 | 8/2012 | Ma | |
| 2013/0069516 A1 | 3/2013 | Sumoyama et al. | |
| 2013/0313960 A1 | 11/2013 | Francesconi | |
| 2014/0152170 A1 | 1/2014 | Kasuya et al. | |
| 2014/0049151 A1 | 2/2014 | Murayama et al. | |
| 2014/0170598 A1 | 6/2014 | Abend et al. | |
| 2015/0145169 A1 | 5/2015 | Liu et al. | |
| 2015/0223869 A1 | 8/2015 | Mayer et al. | |
| 2016/0003150 A1 | 1/2016 | Dicintio et al. | |
| 2016/0082511 A1 | 3/2016 | Cui et al. | |
| 2016/0218489 A1 | 7/2016 | Dicintio et al. | |
| 2016/0243650 A1 | 8/2016 | Lin et al. | |
| 2016/0263832 A1 | 9/2016 | Bui et al. | |
| 2016/0271696 A1 | 9/2016 | Kamakura | |
| 2016/0298213 A1 | 10/2016 | Yang et al. | |
| 2016/0312338 A1 | 10/2016 | Miller | |
| 2017/0040917 A1 | 2/2017 | Chang et al. | |
| 2017/0062798 A1 | 3/2017 | Wang et al. | |
| 2017/0107946 A1 | 4/2017 | Le Cras et al. | |
| 2017/0167357 A1 | 6/2017 | Maier | |
| 2017/0167358 A1 | 6/2017 | Maier et al. | |
| 2017/0179472 A1 | 6/2017 | Allie et al. | |
| 2017/0251546 A1 | 8/2017 | Ikeda et al. | |
| 2017/0253536 A1 | 9/2017 | Danforth et al. | |
| 2017/0264083 A1 | 9/2017 | Niessner et al. | |
| 2017/0304894 A1 | 10/2017 | Buller | |
| 2017/0331260 A1 | 11/2017 | Quest et al. | |
| 2017/0350590 A1 | 12/2017 | Choudhri et al. | |
| 2018/0056604 A1 | 3/2018 | Sands et al. | |
| 2018/0366918 A1 | 12/2018 | Sumoyama et al. | |
| 2018/0369919 A1 | 12/2018 | Burkhardt | |
| 2019/0001415 A1 | 1/2019 | Morimoto et al. | |
| 2019/0009335 A1 | 1/2019 | Kloft et al. | |
| 2019/0366585 A1 | 12/2019 | Nagai et al. | |
| 2019/0375049 A1 | 12/2019 | Werner | |
| 2020/0021084 A1 | 1/2020 | Kimura | |
| 2020/0207069 A1 | 7/2020 | Coupland et al. | |
| 2020/0251872 A1 | 8/2020 | Drachenberg et al. | |
| 2020/0256308 A1 | 8/2020 | Assaad | |
| 2020/0269352 A1 | 8/2020 | Maurer et al. | |
| 2020/0399744 A1 | 12/2020 | Smith et al. | |
| 2021/0053119 A1 | 2/2021 | Geisen | |
| 2021/0086279 A1 | 3/2021 | Clover et al. | |
| 2021/0273417 A1 | 9/2021 | Ritter et al. | |
| 2022/0016800 A1 | 1/2022 | Lescoche et al. | |
| 2022/0032499 A1 | 2/2022 | Lescoche | |
| 2022/0045485 A1 | 2/2022 | Resnick | |
| 2022/0059999 A1 | 2/2022 | Ritsema et al. | |
| 2022/0140576 A1 | 5/2022 | Niessner et al. | |
| 2022/0149598 A1 | 5/2022 | Trebbels | |
| 2023/0231365 A1* | 7/2023 | Konig | H01T 13/39<br>313/46 |
| 2024/0047948 A1* | 2/2024 | Konig | H01T 13/39 |

FOREIGN PATENT DOCUMENTS

| | | | |
|---|---|---|---|
| CN | 203387050 | U | 1/2014 |
| CN | 104923797 | A | 9/2015 |
| CN | 206065410 | U | 4/2017 |
| CN | 106735273 | A | 5/2017 |
| CN | 106881509 | A | 6/2017 |
| CN | 107891200 | A | 4/2018 |
| CN | 107974682 | A | 5/2018 |
| CN | 208299203 | U | 12/2018 |
| CN | 109332694 | A | 2/2019 |
| CN | 110125399 | A | 8/2019 |
| CN | 110899695 | A | 3/2020 |
| CN | 110539386 | B | 2/2021 |
| CZ | 2013291 | A3 | 3/2014 |
| CZ | 2013212 | A3 | 10/2014 |
| CZ | 306282 | B6 | 11/2016 |
| DE | 102012223239 | A1 | 6/2014 |
| DE | 102016209094 | A1 | 11/2017 |
| DE | 112011102588 | B4 | 2/2018 |
| DE | 102016216963 | A1 | 3/2018 |
| DE | 102017221136 | A1 | 5/2019 |
| DE | 102017221137 | A1 | 5/2019 |
| DE | 102018200349 | A1 | 7/2019 |
| DE | 102018212894 | A1 | 2/2020 |
| DE | 102019218408 | A1 | 2/2021 |
| EP | 1594200 | B1 | 11/2007 |
| EP | 1596482 | B1 | 6/2011 |
| EP | 2727898 | A1 | 5/2014 |
| EP | 3035458 | A1 | 6/2016 |
| EP | 3263524 | A1 | 1/2018 |
| FR | 3095149 | A1 | 10/2020 |
| GB | 556330 | A | 9/1943 |
| GB | 2544465 | A | 5/2017 |
| JP | S6355880 | A | 3/1988 |
| JP | H0513145 | A | 1/1993 |
| JP | H0513147 | A | 1/1993 |
| JP | H0554953 | A | 3/1993 |
| JP | H0567488 | A | 3/1993 |
| JP | H0582235 | A | 4/1993 |
| JP | H05159855 | A | 6/1993 |
| JP | H05182742 | A | 7/1993 |
| JP | H05242952 | A | 9/1993 |

(56) References Cited

FOREIGN PATENT DOCUMENTS

| | | | |
|---|---|---|---|
| JP | 1022054 | A | 1/1998 |
| JP | 10106715 | A | 4/1998 |
| JP | H10106716 | A | 4/1998 |
| JP | 3043475 | B2 | 5/2000 |
| JP | 3128270 | B2 | 1/2001 |
| JP | 3192450 | B2 | 7/2001 |
| JP | 3359347 | B2 | 12/2002 |
| JP | 2002359053 | A | 12/2002 |
| JP | 2005150011 | A | 6/2005 |
| JP | 2006185928 | A | 7/2006 |
| JP | 4295064 | B2 | 7/2009 |
| JP | 2009270130 | A | 11/2009 |
| JP | 2013037807 | A | 2/2013 |
| JP | 2014072037 | A | 4/2014 |
| JP | 6288287 | B2 | 3/2018 |
| JP | 6344966 | B2 | 6/2018 |
| JP | 6598081 | B2 | 10/2019 |
| JP | 2021026873 | A | 2/2021 |
| KR | 100400101 | B1 | 9/2003 |
| WO | 9807220 | A1 | 2/1998 |
| WO | 2005025783 | A1 | 3/2005 |
| WO | 2006017687 | A2 | 2/2006 |
| WO | 2013128416 | A2 | 9/2013 |
| WO | 2015173790 | A1 | 11/2015 |
| WO | 2016116385 | A1 | 7/2016 |
| WO | 2016156973 | A1 | 10/2016 |
| WO | 2017143961 | A1 | 8/2017 |
| WO | 2017221010 | A1 | 12/2017 |
| WO | 2019025795 | A1 | 2/2019 |
| WO | WO2019025796 | A1 | 2/2019 |
| WO | WO2020109715 | A1 | 6/2020 |
| WO | WO2020109716 | A1 | 6/2020 |
| WO | 2021253061 | A1 | 12/2021 |
| WO | 2022040544 | A1 | 2/2022 |

OTHER PUBLICATIONS

Pavel Krakhmalev et a.; Microstructure, Solidification Texture, and Thermal Stability of 316 L Stainless Steel Manufactured by Laser Powder Bed Fusion; MDPI Journal; Aug. 15, 2018.

Terrence E. Johnson et. al.; Three-dimensional Projection-based Topology Optimization for Prescribed-angle Self-Supporting Additively Manufactured Structures.

* cited by examiner

SPARK PLUG, SPARK PLUG ELECTRODE, AND METHOD OF MANUFACTURING THE SAME

CROSS-REFERENCE TO RELATED APPLICATION

This application is a continuation of U.S. Non-Provisional application Ser. No. 18/127,488 filed Mar. 28, 2023, which claims the benefit of U.S. Provisional Application No. 63/324,984 filed Mar. 29, 2022, the entire contents of both applications are hereby incorporated by reference.

FIELD

The present invention generally relates to spark plugs and other ignition devices and, in particular, to spark plug electrodes and other components that are made using additive manufacturing processes.

BACKGROUND

Spark plugs are used to initiate combustion in internal combustion engines. Typically, spark plugs ignite an air/fuel mixture in a combustion chamber so that a spark is produced across a spark gap between two or more electrodes. The ignition of the air/fuel mixture by means of the spark triggers a combustion reaction in the combustion chamber, which is responsible for the power stroke of the engine. The high temperatures, the high electrical voltages, the rapid repetition of combustion reactions, and the presence of corrosive materials in the combustion gases can create a harsh environment in which the spark plug must function. The harsh environment can contribute to an erosion and/or corrosion of the electrodes, which can negatively affect the performance of the spark plug over time.

To reduce erosion and/or corrosion of the electrodes, various kinds of precious metals and alloys have been used, such as those having platinum and iridium. These materials are expensive, however, particularly iridium. Consequently, the manufacturers of spark plugs try to minimize the quantity of precious metals used in an electrode. One approach involves using precious metals only on an electrode tip or on a sparking section of the electrodes; i.e., in the place where a spark jumps across the spark gap, as opposed to the entire electrode body itself.

Various joining techniques, such as laser welding, have been used for attaching a precious metal electrode tip to an electrode body. However, when a precious metal electrode tip is laser welded to an electrode body, such as a body made from a nickel alloy, there can be a substantial amount of thermal and/or other stresses on the weld joint during operation of the spark plug due to the different properties of the materials (e.g., different coefficients of thermal expansion, different melting temperatures, etc.). These stresses, in turn, can undesirably lead to cracking or other damage to the electrode body, the electrode tip, the joint connecting the two components, or a combination thereof.

Other factors that can impact the performance of a spark plug are the parallelism of the sparking surfaces and the tolerances of the spark gaps. Those skilled in the art will appreciate that it can be challenging to attach precious metal electrode tips to electrode bodies, such as by laser welding, in such a precise manner that it achieves a desired parallelism between the sparking surfaces. This is particularly true where one of the precious metal electrode tips is a ring, since ring-shaped electrode tips typically have different spark gap distances within the ring gap. It can also be difficult to reduce the tolerance of a spark gap down to a desired level using traditional attachment methods, like laser welding.

The spark plug, spark plug electrode and/or the method described herein are designed to address one or more of the drawbacks and challenges mentioned above.

SUMMARY

According to one example, there is provided a spark plug electrode, comprising: an electrode base that includes an axial end surface, a side surface, and an edge located at an intersection of the axial end surface and the side surface; and an electrode tip that is formed on the electrode base and includes a precious metal-based material and a plurality of laser deposition layers, wherein the electrode tip overhangs at least a portion of the edge.

In accordance with various embodiments, the spark plug electrode may have any one or more of the following features, either singly or in any technically feasible combination:

- the precious metal-based material includes an iridium-based alloy, a platinum-based alloy, a ruthenium-based alloy, a gold-based alloy or a palladium-based alloy;
- the spark plug electrode is a center electrode, the axial end surface is circular, the side surface is cylindrical, the edge is circumferential, and the electrode tip is one of a plurality of electrode tips that are spaced around the circumferential edge of the electrode base;
- the spark plug electrode is a ground electrode, the axial end surface is polygonal, the side surface is flat or curved, the edge is straight or curved, and the electrode tip overhangs the straight or curved edge of the electrode base;
- the spark plug electrode is an annular ground electrode, the axial end surface is annular, the side surface is cylindrical, the edge is circumferential, and the electrode tip is an annular electrode tip that overhangs the circumferential edge of the electrode base;
- the spark plug electrode is an annular ground electrode, the axial end surface is annular, the side surface is cylindrical, the edge is circumferential, and the electrode tip is a dome-shaped electrode tip that overhangs the circumferential edge of the electrode base;
- the spark plug electrode is a center electrode, the axial end surface is circular, the side surface is cylindrical, the edge is circumferential, and the electrode tip is an annular electrode tip that overhangs the circumferential edge of the electrode base;
- the spark plug electrode is a center electrode, the axial end surface is circular, the side surface is cylindrical, the edge is circumferential, and the electrode tip is a solid disk-shaped electrode tip that overhangs the circumferential edge of the electrode base;
- the electrode tip includes a sparking surface that is configured for a radial spark gap, the sparking surface completely overhangs the edge;
- the electrode tip overhangs at least a portion of the edge by an overhang distance X that is at least 15% of an overall length Y of the electrode tip;
- the electrode tip has an overall length Y of 0.6 mm-3.0 mm, a height Z of 0.3 mm-4.0 mm, and an overhang distance X of 0.1 mm-1.4 mm;
- the electrode tip has a three-dimensional rectangular shape with a constant rectangular cross-section along an axial height of the electrode tip;

the electrode tip has a three-dimensional triangular shape with a non-constant rectangular cross-section along the axial height of the electrode tip;

the electrode tip has a three-dimensional annular shape with a constant annular cross-section along an axial height of the electrode tip;

the electrode tip has a plurality of sparking portions in the form of three-dimensional curved tubes;

the electrode tip has one or more three-dimensional partial arches;

the plurality of laser deposition layers are formed on the electrode base by an additive manufacturing process, which uses a powder bed fusion technique to melt or sinter precious metal-based powder onto the electrode base with a laser or electron beam, and then to allow the melted or sintered powder to solidify to become the laser deposition layers of the electrode tip, the plurality of laser deposition layers have an average layer thickness T that is between 5 μm and 60 μm, inclusive, and a total thickness of the plurality of laser deposition layers is an electrode tip height Z that is between 0.05 mm and 3.0 mm, inclusive;

the electrode tip is formed on the electrode base and is oriented such that the plurality of laser deposition layers are perpendicular to a center axis of the spark plug electrode, and the electrode tip is secured to the electrode base with a weldless joint; and a spark plug, comprising: a shell; an insulator that is at least partially disposed within the shell; a center electrode that is at least partially disposed within the insulator; and one or more ground electrode(s) that are either separate components attached to the shell or unitary extensions of the shell, wherein the center electrode, the ground electrode(s), or both the center and ground electrode(s) is the spark plug electrode of claim 1.

According to another example, there is provided an additive manufacturing process for manufacturing a spark plug, comprising the steps of: securing the spark plug in an additive manufacturing tool so that a firing end that has a center electrode base and/or a ground electrode base is exposed; filling an empty cavity within the interior of the spark plug with a filler material, the filler material provides a temporary floor; covering the firing end and the temporary floor with a thin powder layer that includes a precious metal-based material; directing a laser or an electron beam towards the firing end such that it melts or sinters at least some of the thin powder layer; allowing the melted or sintered thin powder layer to at least partially solidify into a laser deposition layer; and repeating the covering, directing and allowing steps for a plurality of cycles so that one or more electrode tip(s) with a plurality of laser deposition layers is formed, wherein at least one of the electrode tip(s) overhangs an edge of the center electrode base or the ground electrode base.

DRAWINGS

Preferred embodiments will hereinafter be described in conjunction with the appended drawings, wherein like designations denote like elements, and wherein.

DESCRIPTION

Figure 1:
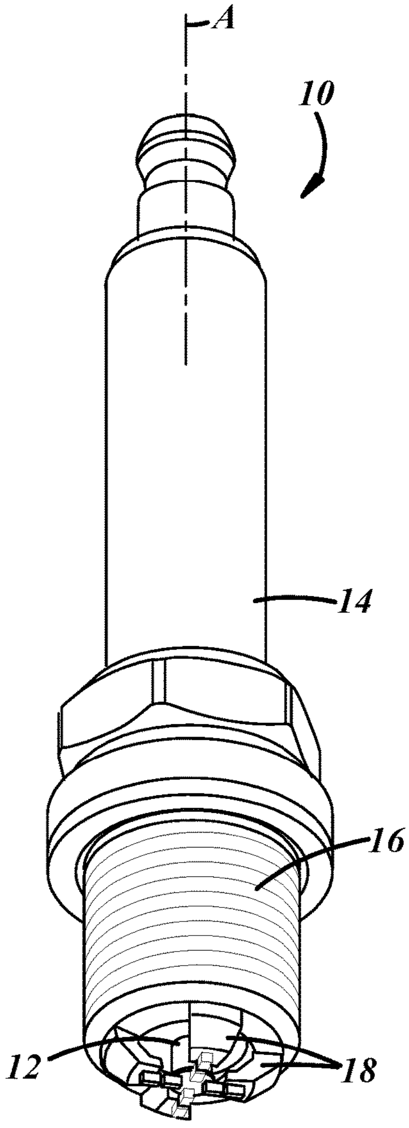
FIG. 1 is a perspective view of a spark plug.

The spark plugs and spark plug electrodes disclosed herein include one or more electrode tip(s) formed on one or more electrode base(s) using an additive manufacturing process, such as a powder bed fusion technique, such that each electrode tip overhangs an edge of a corresponding electrode base. The overhanging electrode tip(s) formed by an additive manufacturing process can improve the voltage requirements of the spark plug, the flame growth, the parallelism of the sparking surfaces, the spark gap tolerances, the precious metal erosion rates, the cost effectiveness of the precious metals, or a combination thereof, to cite a few possible benefits. Some non-limiting examples of potential powder bed fusion techniques that may be used include: selective laser melting (SLM), selective laser sintering (SLS), direct metal laser sintering (DMLS), and electron beam melting (EBM).

By way of example, the electrode base(s) may be made of a nickel-based material, while the electrode tip(s) are made of a precious metal-based material, such as one having iridium, platinum, palladium, ruthenium, rhodium, gold, etc. The precious metal-based material is selected to improve the resistance of the spark plug electrode to corrosion and/or electrical erosion. By using an additive manufacturing process to build the electrode tip(s) on the electrode base(s), spark plug electrodes with one or more overhanging or cantilevered electrode tip(s) can be formed. Those skilled in the art will appreciate that when a precious metal-based electrode tip is joined to a nickel-based electrode base, such as by laser welding, there is typically a substantial amount of thermal and/or other stresses on the weld joint during operation of the spark plug due to various factors (e.g., different coefficients of thermal expansion, different melting temperatures, uneven or nonuniform welds, etc.). These stresses, in turn, can undesirably lead to cracking or other damage to the electrode base(s), the electrode tip(s), the joint connecting the two components, or a combination thereof. The spark plugs and spark plug electrodes described herein, with one or more overhanging electrode tip(s) formed by additive manufacturing, are designed to address such challenges in an economical manner.

The spark plug electrodes disclosed herein may be used in a wide variety of spark plugs and other ignition devices including industrial spark plugs, automotive spark plugs, aviation igniters, glow plugs, prechamber plugs, or any other device that is used to ignite an air/fuel mixture in an engine or other piece of machinery. This includes, but is certainly not limited to, the exemplary industrial spark plugs that are shown in the drawings and are described below. Furthermore, it should be noted that the present spark plug electrodes may be used as center and/or ground electrodes. Other embodiments and applications of the spark plug electrodes are also possible. Unless otherwise specified, all percentages provided herein are in terms of weight percentage (wt %) and all references to axial, radial and circumferential directions are based on the center axis A of the spark plug or spark plug electrode.

Figure 2:
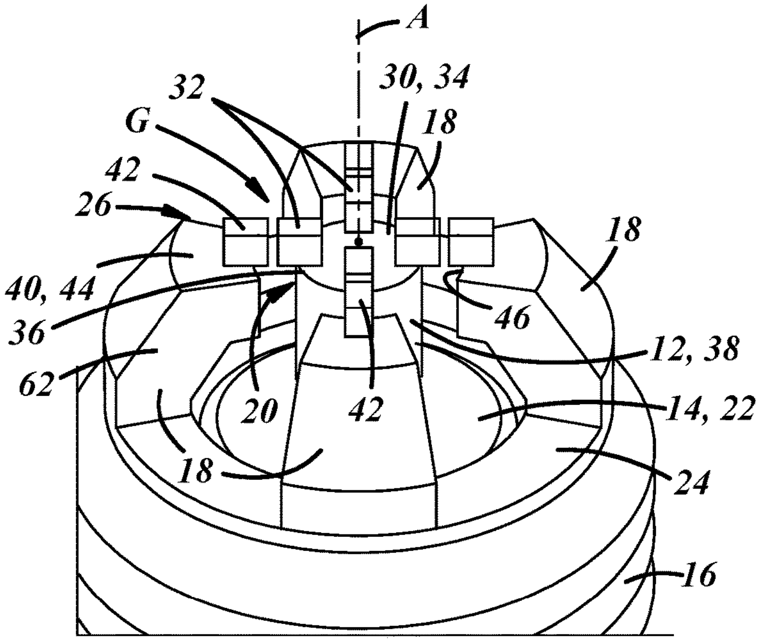
FIG. 2 is an enlarged perspective view of a firing end of the spark plug in FIG. 1, where the firing end has electrode tips built onto electrode bases via an additive manufacturing process.
Figure 3:
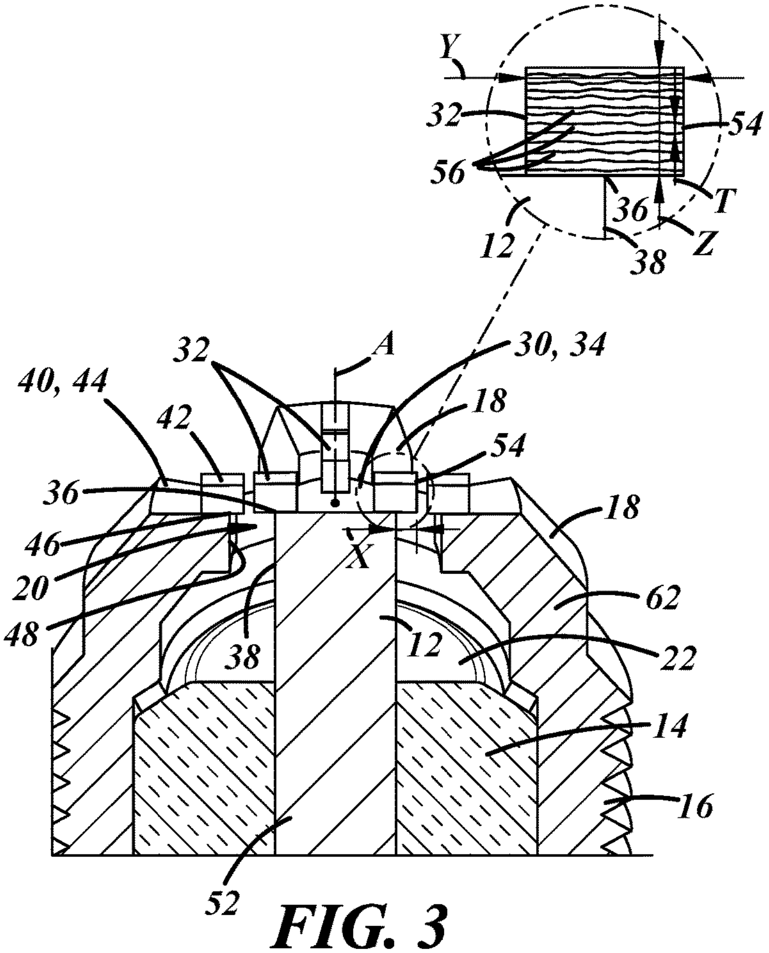
FIG. 3 is an enlarged cross-sectional view of the firing end in FIG. 2.

Referring to FIGS. 1-3, there is shown an exemplary spark plug 10 that includes a center electrode 12, an insulator 14, a metallic shell 16, and several ground electrodes 18. The center electrode 12 is an elongated component disposed within an axial bore of the insulator 14 and includes a firing end 20 that protrudes beyond a free end 22 of the insulator 14. As explained below in more detail, the firing end 20 may include an electrode base 30 made from a nickel-based material and a number of electrode tips 32 made from a precious metal-based material, where the electrode tips are formed on an axial end surface 34 of the electrode base using an additive manufacturing process so that the electrode tips overhang an edge 36 of the electrode base. The edge 36 may be a circumferential edge located at an intersection of the circular axial end surface 34 and the cylindrical side surface 38 of the center electrode. Insulator 14 is disposed within an axial bore of the metallic shell 16 and is constructed from a material, such as a ceramic material, that is sufficient to electrically insulate the center electrode 12 from the metallic shell 16. The free end 22 of the insulator 14 may be slightly retracted within a free end 24 of the metallic shell 16, as shown, or it may protrude beyond the metallic shell 16. The ground electrodes 18 may be constructed so as to form radial spark gaps G with the center electrode 12, as shown in the drawings, and extend from the free end 24 of the metallic shell 16. In one embodiment, not shown, each of the ground electrodes 18 is a separate or discrete component that is attached to the shell 16, such as by welding, and includes a firing end 26 with an electrode base 40 that is made from a nickel-based material (e.g., Inconel 600, 601, etc.) and an electrode tip 42 that is made from a precious metal-based material. This embodiment may have one or more of the following potential advantages: the ground electrodes can be made with alloys like Inconel that are optimized for the firing end, greater design freedom for the ground electrodes, easier integration of heat dissipating cores, potential use of alternative manufacturing techniques like metal injection molding (MIM), additive manufacturing, etc. In a different embodiment, like the one shown, each of the ground electrodes 18 is a unitary extension of the shell 16 and is made from the same material as the shell, such as a nickel-based or iron-based material (e.g., various Inconel alloys, steels, etc.). Such an embodiment may have one or more of the following potential advantages: it is generally less expensive to manufacture, it is easier to ensure dimensional alignment between ground and center electrode surfaces, etc. In both embodiments, whether the ground electrodes be separate components of the shell or unitary extensions of the shell, the part of the spark plug that includes the ground electrode base is the "ground electrode" (e.g., ground electrode base 40 is the part of the spark plug upon which one or more electrode tip(s) 42 are formed by additive manufacturing, and ground electrode 18 is the part of the spark plug that includes the ground electrode base 40). As with their center electrode counterparts, each of the ground electrode tips 42 is formed on an axial end surface 44 of a ground electrode base 40 using an additive manufacturing process and overhangs an edge 46, which is located at an intersection of the axial end surface 44 and a radial or side surface 48 of the ground electrode. Thus, each precious metal-based ground electrode tip 42 of a ground electrode 18 opposes a corresponding precious metal-based center electrode tip 32 of the center electrode 12 such that a radial spark gap G is established therebetween. The electrode tips 32, 42 may be provided according to a number of different sizes, shapes, embodiments, etc., as described below, such that they provide sparking surfaces for the emission, reception, and exchange of electrons across the spark gap(s) G. The electrode tips 32, 42 may be formed from the same precious metal-based material or they may be formed from different precious metal-based materials.

In the example shown in FIGS. 1-3, each electrode base 30, 40 may be an extension of and made from the same material as a main electrode body 52, 62, respectively. Though not shown, it is possible for one or both of the main electrode bodies 52, 62 to also include a thermal dissipating core, such as one made from a copper-based material, that removes heat from the firing end of the spark plug. The electrode base 30, 40 may be part of the electrode body 52, 62, respectively, and may have the same diameter, or it may be machined, drawn down, or otherwise manufactured so that it has a smaller diameter or dimension than that of the adjacent electrode body and, thus, provides a pedestal or surface upon which the corresponding electrode tips 32, 42 can be built. As will be explained more thoroughly, an additive manufacturing process may be used to form the electrode tips 32, 42 directly on the electrode bases 30, 40, respectively, by selectively directing a laser or electron beam at a bed of precious metal-based powder that is brought into contact with axial ends of the electrode bases. This causes the precious metal-based powder, as well as portions of the electrode base, to melt or intermix together and solidify at the firing ends 20, 26. The additive manufacturing process is then repeated so that the precious metal-based electrode tips 32, 42 are built up, one layer at a time, on the electrode bases 30, 40 until desired heights are reached. By controlling various parameters, such as laser energy distribution, powder layer thicknesses and/or laser impingement patterns, the additive manufacturing process is able to build precious metal-based electrode tips 32, 42 directly on electrode bases 30, 40 such that each of the tips overhangs or extends beyond a corresponding edge 36, 46 of the electrode. This causes the tips 32, 42 to have a cantilevered configuration, somewhat like an outcropping, that can be beneficial to the operation of the spark plug. In a different example, an additive manufacturing process may be used to form electrode tips 32, 42 onto electrode bases 30, 40, respectively, that are part of intermediate pieces (e.g., ones made from nickel-based materials, such as alloys having nickel and precious metal(s)). The intermediate pieces are, in turn, attached to the electrode bodies 52, 62.

In FIGS. 1-3, there are four center electrode tips 32 and four ground electrode tips 42 (a center electrode tip 32 and an opposing ground electrode tip 42 together make an electrode tip pair), where the four electrode tip pairs are circumferentially spaced from one another by about 90° around the center axis A. Each electrode tip 32, 42 may have a rectangular prism shape (e.g., a three-dimensional rectangular shape with a constant, rectangular cross-section along the axial height of the tip (i.e., the cross-sectional size and shape is constant no matter where the cross-section is taken along the center axis A)). Because the electrode tips 32 of center electrode 12 may be the same size, shape and/or composition as the electrode tips 42 of ground electrode 18, the following description of electrode tips 32 applies equally to electrode tips 42 (i.e., a separate, duplicate description has been omitted). Each electrode tip 32 is made from a precious metal-based material, such as an iridium- or platinum-based alloy, and is built layer-by-layer on an axial end surface 34 of electrode base 30. As will be explained below, additive manufacturing processes, such as those utilizing powder bed fusion and/or other 3D printing techniques, can be used to build a number of thin laser deposition layers 56 on top of one another; the sum of which constitutes an electrode tip 32. Although the laser deposition layers 56 are illustrated in the drawings as distinct, stratified layers, this is not necessary or required, as these are only illustrations. Some laser deposition layers are not readily visible, even though they are present in the electrode tip due to their formation by an additive manufacturing process; these are to be construed as laser deposition layers. One or more of the electrode tips 32 overhangs or extends beyond an edge 36 of the electrode base 30 by an overhang distance X, which is preferably at least 15% of the overall length Y of the tip, or even more preferably at least 20% of the overall length Y, or even more preferably at least 25% of the overall length Y (best shown in FIG. 3). This overhanging configuration causes a sparking surface 54, which is part of a distal end portion of the electrode tip 32 and is configured for a radial spark gap G, to completely overhang the edge 36. Put differently, the sparking surface 54 faces a corresponding parallel sparking surface of the ground electrode tip 42 across the radial gap G and is located completely beyond the edge 36, as opposed to being flush with or inwardly recessed from the edge. The overhanging or cantilevered nature of electrode tip 32 can improve the flame growth and/or voltage requirements and, hence, the performance of the spark plug. According to one non-limiting example which is particularly well suited for industrial applications, each of the electrode tips 32, 42 has an overall length Y of 0.6 mm-3.0 mm and preferably 1.2 mm-1.8 mm (radial direction), a height Z of 0.3 mm-4.0 mm and preferably 0.6 mm-2.6 mm (axial direction), and an overhang distance X of 0.1 mm-1.4 mm and preferably 0.2 mm-0.8 mm (radial direction). The electrode tips 32, 42 may be formed from the same precious metal-based material or they may be formed from different precious metal-based materials. Also, the electrode tip pairs may all have the same spark gap dimension or they may have different spark gap dimensions (e.g., a first electrode tip pair could have a first spark gap of 0.2 mm, a second electrode tip pair could have a second spark gap of 0.25 mm, a third electrode tip pair could have a third spark gap of 0.3 mm, etc.). Other embodiments are possible as well.

As mentioned above, the spark plug and spark plug electrode of the present application are not limited to the exemplary configuration shown in FIGS. 1-3, as they may be employed in any number of different applications, including various industrial spark plugs, automotive spark plugs, aviation igniters, glow plugs, prechamber plugs, or other devices. Some non-limiting examples of other potential embodiments are illustrated in FIGS. 4-24, where similar reference numerals as used in FIGS. 1-3 denote similar features. Unless stated otherwise, any feature or component described in conjunction with one example may be used or employed in another example as well, even if not expressly stated. Other examples, such as various types of plugs with different axial, radial and/or semi-creeping spark gaps; prechamber, non-prechamber, shielded and/or non-shielded configurations; multiple center and/or ground electrodes; as well as plugs that burn or ignite gasoline, diesel, natural gas, hydrogen, propane, butane, etc. are certainly possible. The spark plug, spark plug electrode and method of the present application are in no way limited to the illustrative examples shown and described herein.

Figure 4:
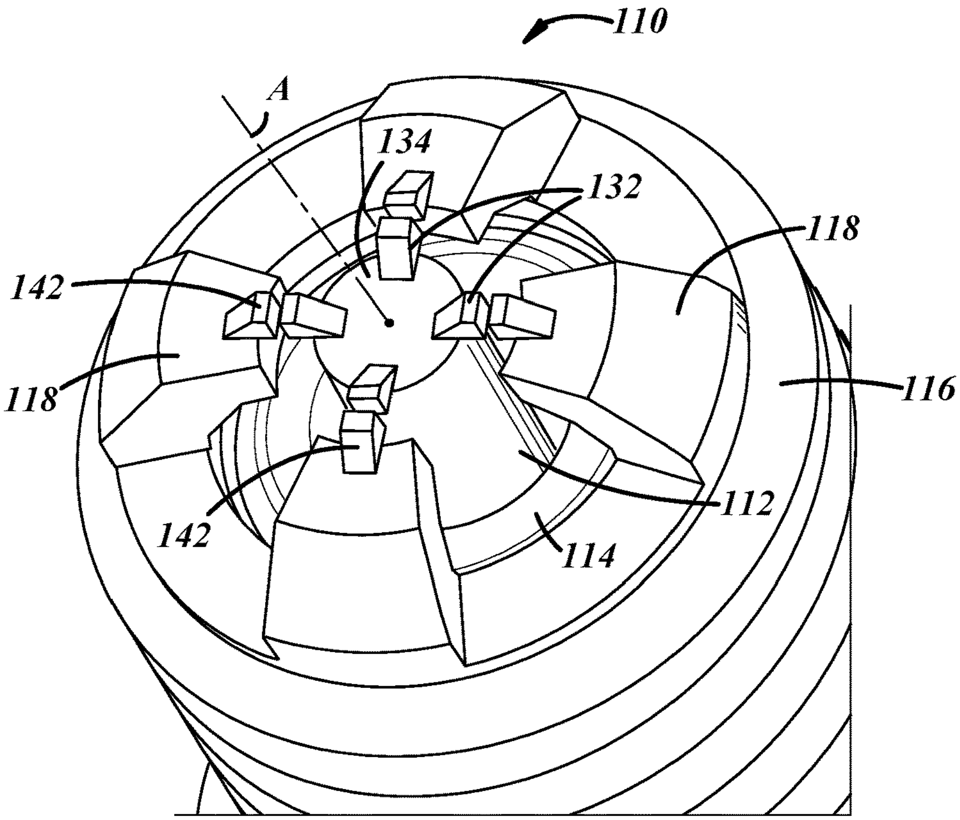
FIGS. 4-5 are enlarged perspective and cross-sectional views, respectively, of another example of a firing end that may be used with the spark plug in FIG. 1, where the electrode tips of the center and ground electrodes in this example have different configurations than those shown in FIGS. 2 and 3.
Figure 5:
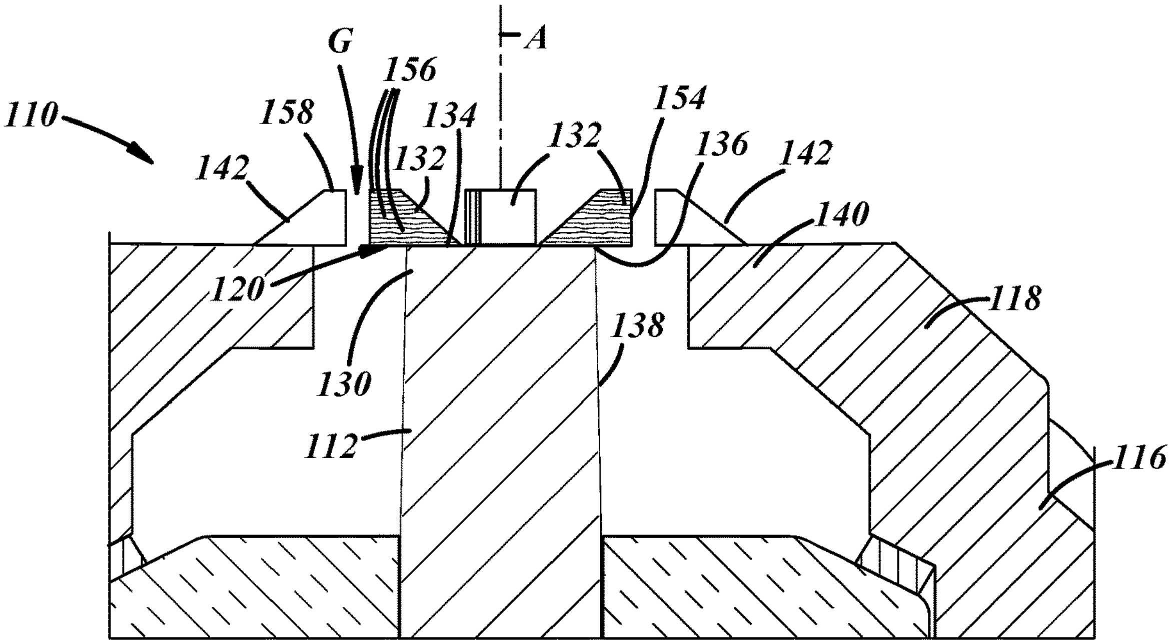

Turning to FIGS. 4-5, there is shown another example of a spark plug 110 that includes a center electrode 112, an insulator 114, a metallic shell 116, and a number of ground electrodes 118, except the center and ground electrodes 112, 118 have precious metal-based electrode tips 132, 142, respectively, that generally have a triangular prism shape (e.g., a three-dimensional triangular shape with a non-constant, rectangular cross-section along the axial height of the tip (i.e., the cross-sectional size and/or shape is non-constant or changes depending where the cross-section is taken along the center axis A)). Even though the overall tip is triangular, the footprint and cross-section of the tip is rectangular. This example also has four electrode tip pairs (i.e., four center electrode tips 132 and four opposing ground electrode tips 142), where the electrode tip pairs are circumferentially spaced or separated from one another by about 90°. Again, due to the similar nature of electrode tips 132 and 142, center electrode tips 132 are described below with the understanding that this description applies equally to the ground electrode tips 142. Each of the electrode tips 132 may include a plurality of laser deposition layers 156, which are thin layers of precious metal-based material that are formed by an additive manufacturing process and are layered or stacked upon one another. The electrode tips 132, like their FIGS. 1-3 counterparts, are designed to extend beyond an edge 136, which is located at the intersection of the axial end surface 134 and a side surface 138 of the center electrode, in order to have an overhanging or cantilevered configuration. According to this particular example, each of the electrode tips 132 has a triangular prism shape where a top of the tip has been truncated or cut off to reveal a flat tip surface 158. The sparking surface 154 of center electrode tip 132 faces an opposing sparking surface of the ground electrode tip 142 across a radial spark gap G such that the two sparking surfaces are generally parallel to another. Another difference with this example is that the side surface 138 of the center electrode 112 may be slightly tapered towards its firing end 120; the tapered surface 138 causes the electrode base 130 to be somewhat narrowed or smaller in diameter at its axial end surface 134, thus, further accentuating the cantilevered nature of the electrode tip 132. Other differences may exist as well.

Figure 6:
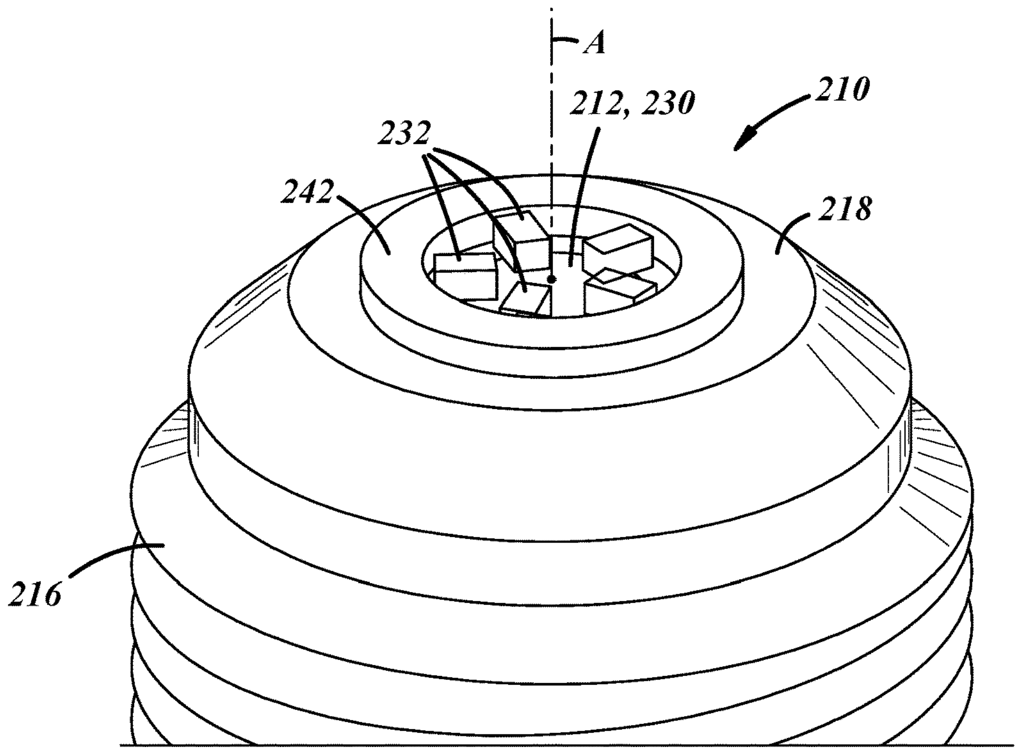
FIGS. 6-7 are enlarged perspective and cross-sectional views, respectively, of another example of a firing end that may be used with the spark plug in FIG. 1, where the electrode base and the electrode tip of the ground electrode have different configurations than those shown in FIGS. 2 and 3.
Figure 7:
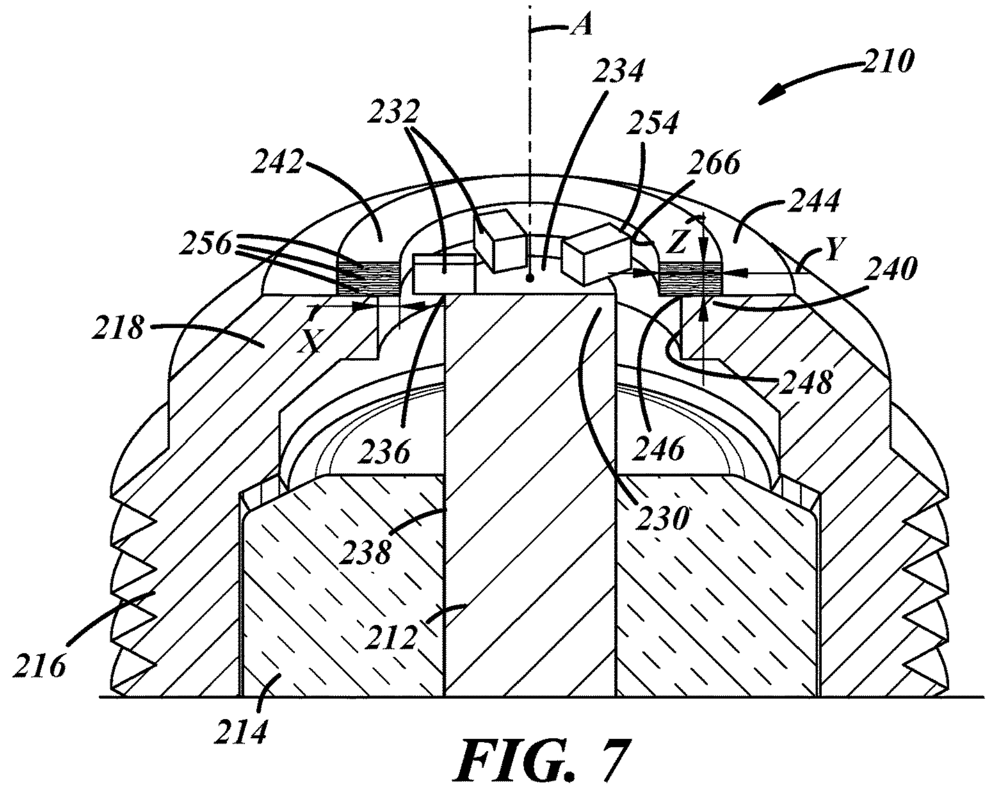

In FIGS. 6-7, another example of a spark plug 210 is shown that includes a center electrode 212, an insulator 214, a metallic shell 216, and a ground electrode 218. Two differences between this example and the previous examples are: the configuration of the ground electrode 218 which is a single annular ground electrode, and the number and configuration of the center and ground electrode tips 232, 242. The center electrode 212 may have a standard electrode base 230 and axial end surface 234 which supports five electrode tips 232 that are circumferentially spaced from one another by about 72°, and the ground electrode 218 may have an annular electrode base 240 that circumferentially surrounds the center electrode 212. The annular electrode base 240 is the portion of the ground electrode 218 upon which the ground electrode tip 242 is built and, as best shown in the cross-sectional view of FIG. 7, it may itself be an overhanging annular ledge of sorts (i.e., the annular electrode base 240 may overhang the underlying ground electrode 218 such that it extends radially towards the center electrode 212, just as the electrode tip 242 may overhang the underlying annular electrode base 240 and extend radially towards the center electrode 212). This double or stacked overhanging configuration can help improve the voltage requirements of the spark plug 210. The ground electrode 218 may be a separate component from the shell 216 or it may be a unitary extension of the shell, as explained above. Electrode tips 232 extend beyond and overhang a circumferential edge 236 formed at the intersection of side and axial end surfaces 238, 234 of the center electrode 212, whereas electrode tip 242 extends beyond and overhangs a circumferential edge 246 which is at the intersection of side and axial end surfaces 248, 244 of the ground electrode 218. The center electrode tips 232 are made from a precious metal-based material using an additive manufacturing process and may be rectangular prism shaped, as illustrated, or they may have another shape instead. The ground electrode tip 242 is a single or unitary piece that is configured as a continuous ring shape (e.g., a three-dimensional annular shape with a constant, annular cross-section along the axial height of the tip) and is made from a precious metal-based material (could be the same or different material as the center electrode tip 232). Since both the center and ground electrode tips 232, 242 are made using an additive manufacturing process, like a powder bed fusion technique, each tip may include a number of stacked laser deposition layers 256 (only the layers of the ground electrode tip are shown for purposes of simplicity, but the center electrode tips may include such layers as well). Again, it is not required that the laser deposition layers 256 be as distinct and pronounced as they are in FIG. 7, which is merely an illustrated drawing. Sparking surfaces 254 of the center electrode tips 232 may either be cylindrical or flat, whereas a continuous sparking surface 266 of the ground electrode tip 242 is cylindrical. When sparking surfaces 254, 266 are both cylindrical, they are parallel to one another such that the radial spark gap G is uniform. According to one non-limiting example that is particularly well suited for an industrial application, each of the electrode tips 232, 242 has an overall length Y (or radial thickness in the case of ring 242) of 0.6 mm-3.0 mm and preferably 1.2 mm-1.8 mm (radial direction), a height Z of 0.3 mm-4.0 mm and preferably 0.6 mm-2.6 mm (axial direction), and an overhang distance X of 0.1 mm-1.4 mm and preferably 0.2 mm-0.8 mm (radial direction). Of course, other differences may exist as well.

Figure 8:
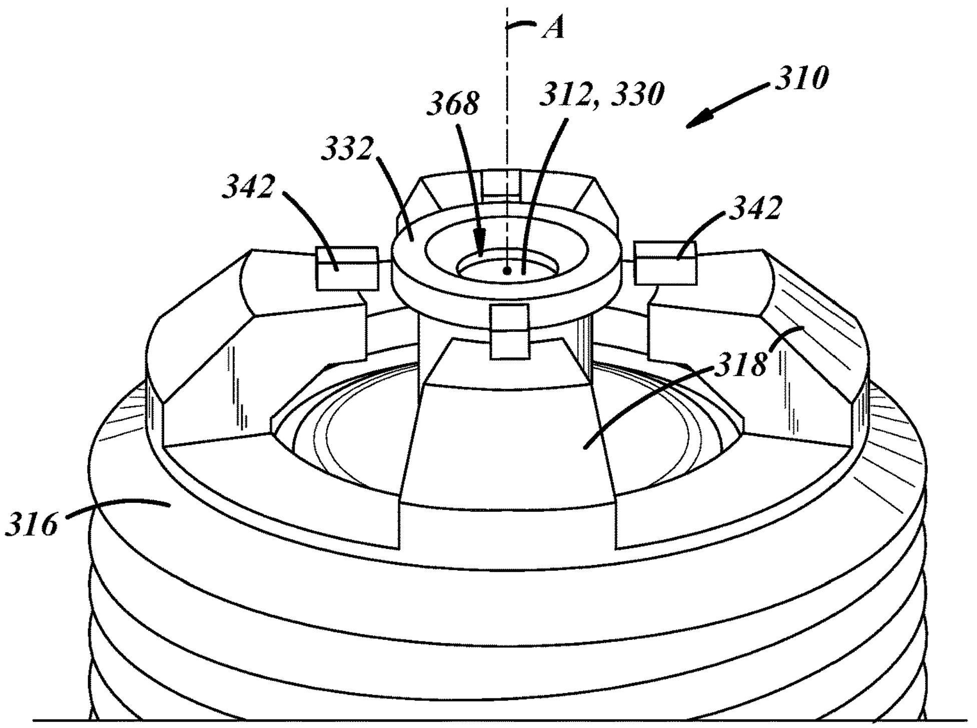
FIGS. 8-9 are enlarged perspective and cross-sectional views, respectively, of another example of a firing end that may be used with the spark plug in FIG. 1, where the electrode tip of the center electrode has a different configuration than those shown in FIGS. 2 and 3.
Figure 9:
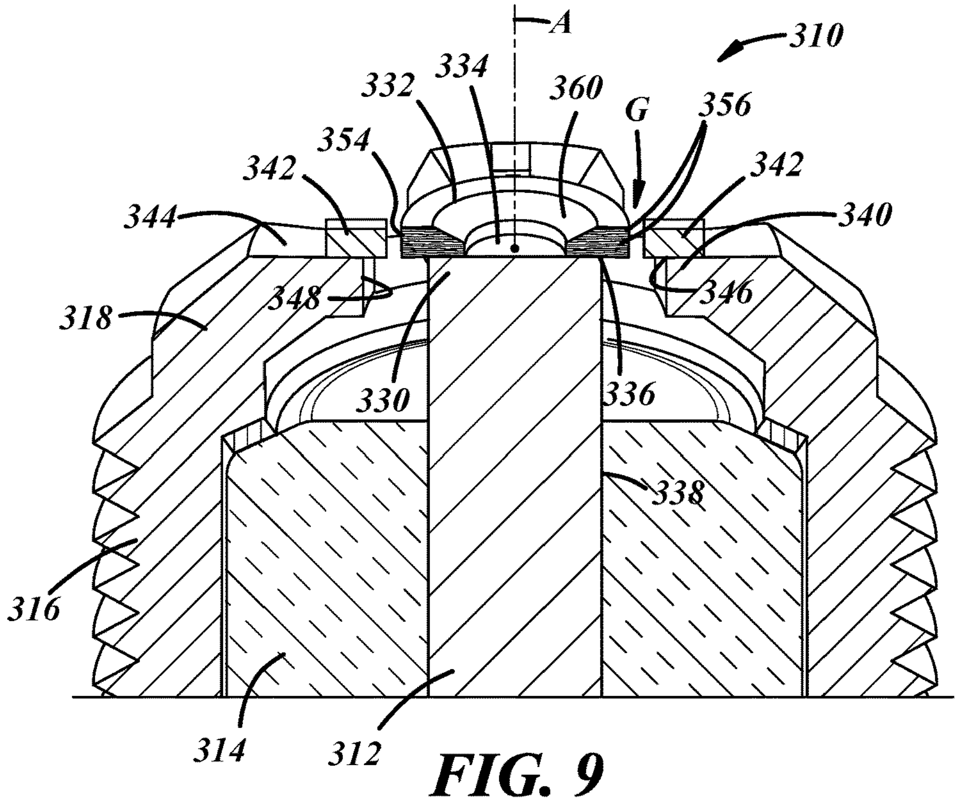

FIGS. 8-9 illustrate another possible example of a spark plug 310 where the center electrode tip 332 is now a single annular piece and the ground electrode tips 342 are now four discrete pieces circumferentially separated from one another by about 90°. Spark plug 310 includes a center electrode 312 with an electrode base 330 and axial end surface 334, an insulator 314, a metallic shell 316, and a number of ground electrodes 318 with electrode bases 340 and axial end surfaces 344. The center and ground electrodes 312, 318 are similar to those described in FIGS. 1-3 and, thus, are not redescribed here. The center electrode tip 332 is a ring-shaped or annular piece that is made using an additive manufacturing process so that it comprises a number of thin laser depositions layers 356 formed from one or more precious metal-based material(s). A sparking surface 354, which is located on an outer radial side of center electrode tip 332, faces opposing sparking surfaces of the ground electrode tips 342 such that the sparking surfaces are generally parallel and face one another across radial spark gaps G. A non-sparking surface 360 located on an inner radial side of center electrode tip 332, away from the radial spark gap G, may be chamfered, angled or rounded. The center electrode tip 332 is a single or unitary piece that is configured as a continuous ring shape (e.g., a three-dimensional annular shape with a non-constant, annular cross-section along the axial height of the tip and an opening or hole 368 towards the center). Although the cross-section may be constant towards the lower axial part of the tip 332, before the start of the chamfered non-sparking surface 360, the cross-section towards the upper axial part changes in size due to the chamfered surface; thus, the overall cross-section is non-constant. Such a configuration can reduce the amount of expensive precious metal-based material that is needed, without impacting the characteristics and performance of the sparking surfaces, which are parallel to one another. Electrode tip 332 extends beyond and overhangs an edge 336 located at the intersection of side and axial end surfaces 338, 334 of the center electrode 312, whereas electrode tips 342 extend beyond and overhang edges 346 which are at the intersection of side and axial end surfaces 348, 344 of the ground electrodes 318. A feature of the additive manufacturing process is that each of the center and ground electrode tips 332, 342 includes a collection of laser deposition layers 356 that are built or stacked on top of one another, layer by layer. The dimensions Y, Z and X that were provided in conjunction with the example of FIGS. 6-7 may be applied to this example as well.

Figure 10:
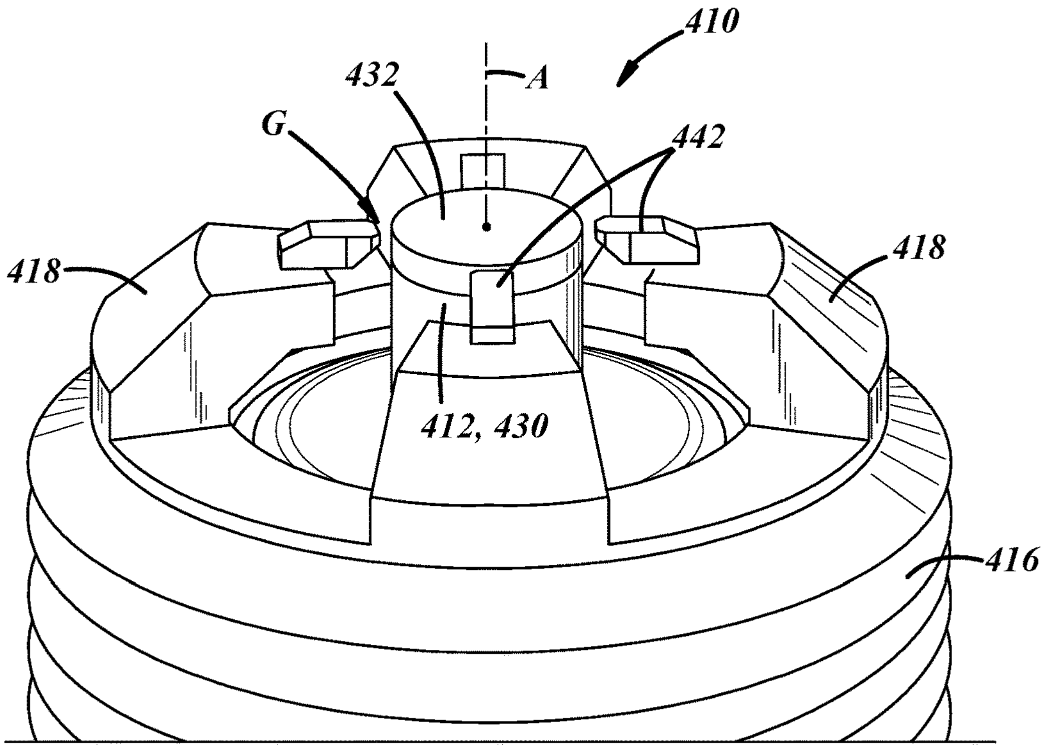
FIGS. 10-11 are enlarged perspective and cross-sectional views, respectively, of another example of a firing end that may be used with the spark plug in FIG. 1, where the electrode tips in this example have different configurations than those shown in FIGS. 2 and 3.
Figure 11:
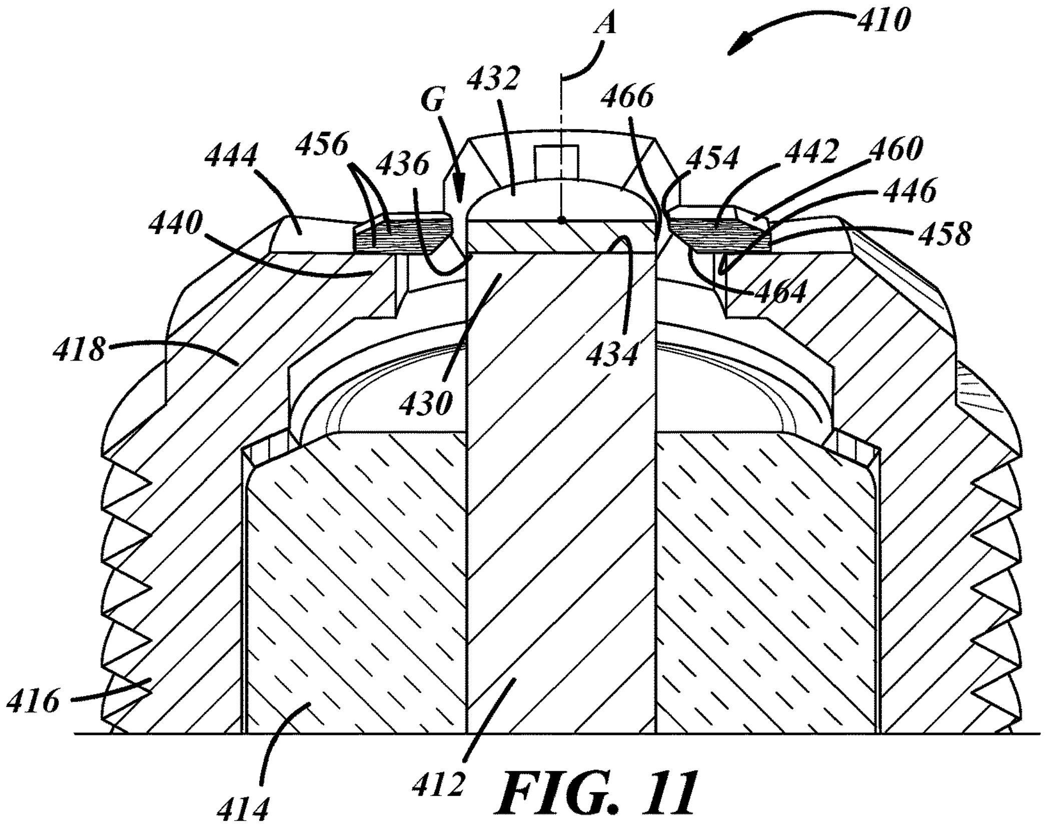

Moving on to FIGS. 10-11, there is shown another example of a spark plug 410 having a center electrode 412, an insulator 414, a metallic shell 416, and ground electrodes 418. The center electrode 412 is an elongated component with an electrode tip 432 in the shape of a solid disc that is built on an electrode base 430 such that it entirely covers an axial end surface 434 of the center electrode. Each of the ground electrodes 418 is an individual piece that extends from the shell 416 and has an electrode base 440 that carries a ground electrode tip 442 made of a precious metal-based material. The four ground electrode tips 442 are circumferentially spaced or separated from one another by about 90° around the center axis A. In this example, each of the electrode tips 442 is formed on an axial end surface 444 of a ground electrode 418 and is generally in the shape of a three-dimensional polygon (e.g., a parallelopiped that has been truncated or altered so as to form flat and angled sparking surfaces 454 and 464, respectively, on an inner radial side of the tip that faces a radial spark gap G, and flat and angled non-sparking surfaces 458 and 460, respectively, on an outer radial side facing away from the radial spark gap G). It may be desirable for both of the surfaces 454, 464 that face the radial spark gap G to overhang an edge 446 of the corresponding ground electrode 418. One difference between the radial spark gap G of this example and those of the previous examples is that surfaces 454, 464 of the ground electrode tip 442 do not extend in a parallel facing manner to the sparking surface 466 of the center electrode tip 432 for the entire axial length of the radial spark gap G. Instead, the two sparking surfaces 454, 466 may extend in a parallel manner that is aligned with the axial direction for only a portion of the axial length of the radial spark gap G, and surfaces 464, 466 extend in a non-parallel or divergent manner for another portion of the axial length of the radial spark gap G. Due to the smaller spark gap located between sparking surfaces 454, 466, it is expected that a majority of the sparking will occur in this area. The electrode tip 432 is shown in a non-overhanging arrangement such that the sparking surface 466 is flush with a circumferential edge 436, as opposed to overhanging it, and alternatively could even be set back or retracted from the edge 436 or extended to overhang the edge 436. Each electrode tip 432, 442 can include a number of thin laser deposition layers 456 that are formed during an additive manufacturing process, as described below in greater detail. Of course, spark plug 410 could be provided according to other embodiments, such as where the center electrode tip 432 overhangs the edge 436 and/or is annular, as opposed to being disk-shaped.

Figure 12:
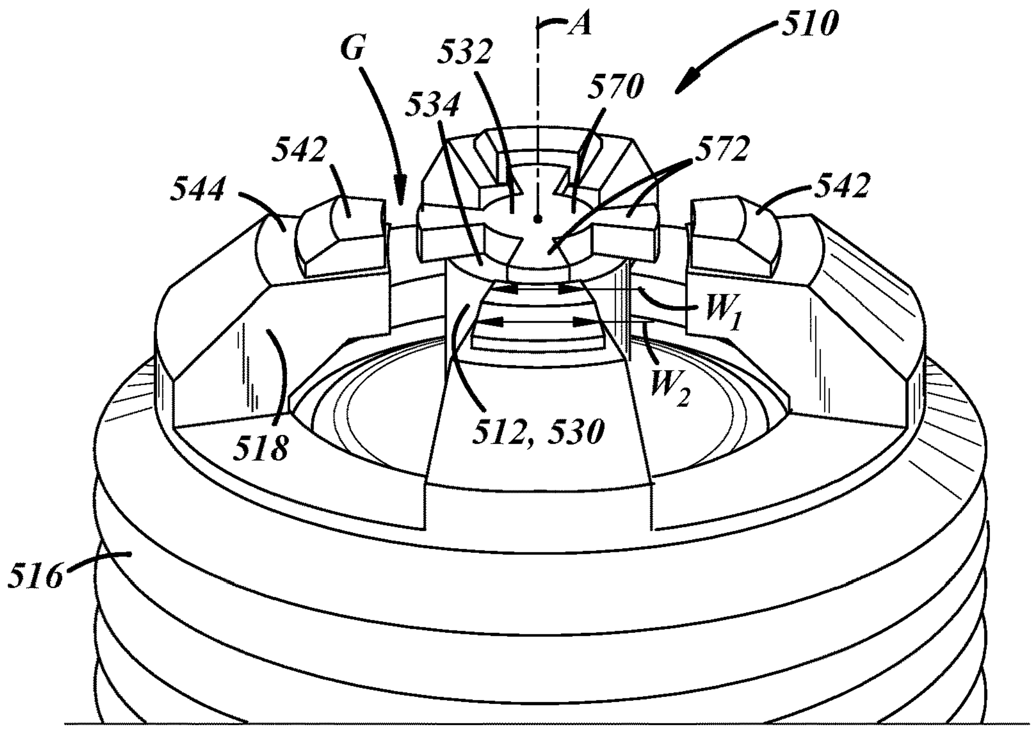
FIGS. 12-13 are enlarged perspective and cross-sectional views, respectively, of another example of a firing end that may be used with the spark plug in FIG. 1, where the electrode tips of the center and ground electrodes in this example have different configurations than those shown in FIGS. 2 and 3.
Figure 13:
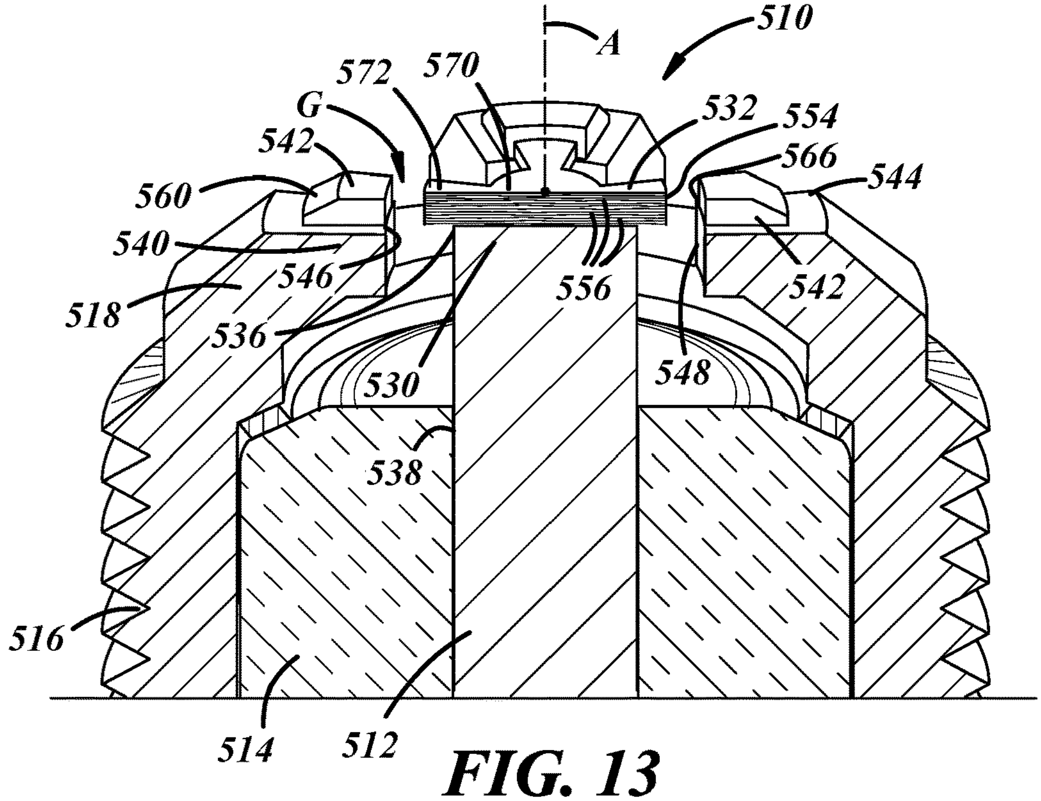

FIGS. 12 and 13 illustrate another example of a spark plug 510 that includes a center electrode 512 with an electrode base 530 and axial end surface 534, an insulator 514, a metallic shell 516, and ground electrodes 518 with an electrode base 540 and an axial end surface 544. The center electrode 512 further includes an electrode tip 532 that is made of a precious metal-based material and has somewhat of a star-shaped configuration with a center portion 570 and a number of lobe portions 572. According to this particular example, the center portion 570 is generally in the shape of a circular disk and the lobe portions 572 are in the shape of wedges or pie pieces extending in a radial manner from the center portion. Each of the lobe portions 572 has a sparking surface 554 at an outer radial side that faces an opposing sparking surface 566 of a ground electrode tip 542 across a radial spark gap G. It is possible for both of the sparking surfaces 554, 566 to be complementary curved surfaces (e.g., one surface is convex curved while the other is concave curved such that a uniform spark gap G is maintained across the curved sparking surfaces), for both of the sparking surfaces 554, 566 to be complementary flat surfaces (e.g., like that shown in FIGS. 1-3 and 4-5 such that a uniform spark gap G is maintained across the flat sparking surfaces), or for one of the sparking surfaces 554, 566 to be curved and one to be flat (e.g., like that shown in FIGS. 6-7, 8-9 and 10-11 such that a slightly non-uniform spark gap G is established across the curved and flat sparking surfaces). The aforementioned examples only represent some of the possibilities. The four ground electrode tips 542 may be circumferentially spaced from one another by about 90° and built upon corresponding electrode bases 540 using additive manufacturing techniques. According to one example, electrode tips 542 are in the shape of truncated wedges or pie pieces with a sparking surface 566 located on an inner radial side and a non-sparking surface 560 located on an outer radial side facing away from the spark gap G. Electrode tip 532 extends beyond and overhangs an edge 536 at the intersection of side and axial end surfaces 538, 534 of the center electrode 512, whereas electrode tips 542 are flush with or are even retracted from an edge 546 which is at the intersection of side and axial end surfaces 548, 544 of the ground electrode 518. As with the previous examples, the electrode tips 532, 542 may include a number of thin laser deposition layers 556 stacked on top of one another to achieve the desired axial heights of the tips. The non-sparking surface 560 on the backside of the electrode tip 542 can be tapered, rounded or chamfered, as shown, in order to reduce the amount of expensive precious metal-based material, as well as to improve the flame growth around the firing end of the spark plug. Since the ground electrode tips 542 are wedge or pie shaped, they can be narrower in a circumferential dimension at the sparking surface 566 than they are at the non-sparking surface 560. This is illustrated in FIG. 12, where the circumferential width $W_1$ at the inner radial side is smaller than the circumferential width W2 at the outer radial side, and is different than most of the previous embodiments where the circumferential width of discrete electrode tips is generally uniform. According to the illustrated examples, electrode tip 532 has a constant cross-section along the axial height of the tip, and electrode tip 542 has a non-constant cross-section along the axial height of the tip due to the sloping surface 560.

Figure 14:
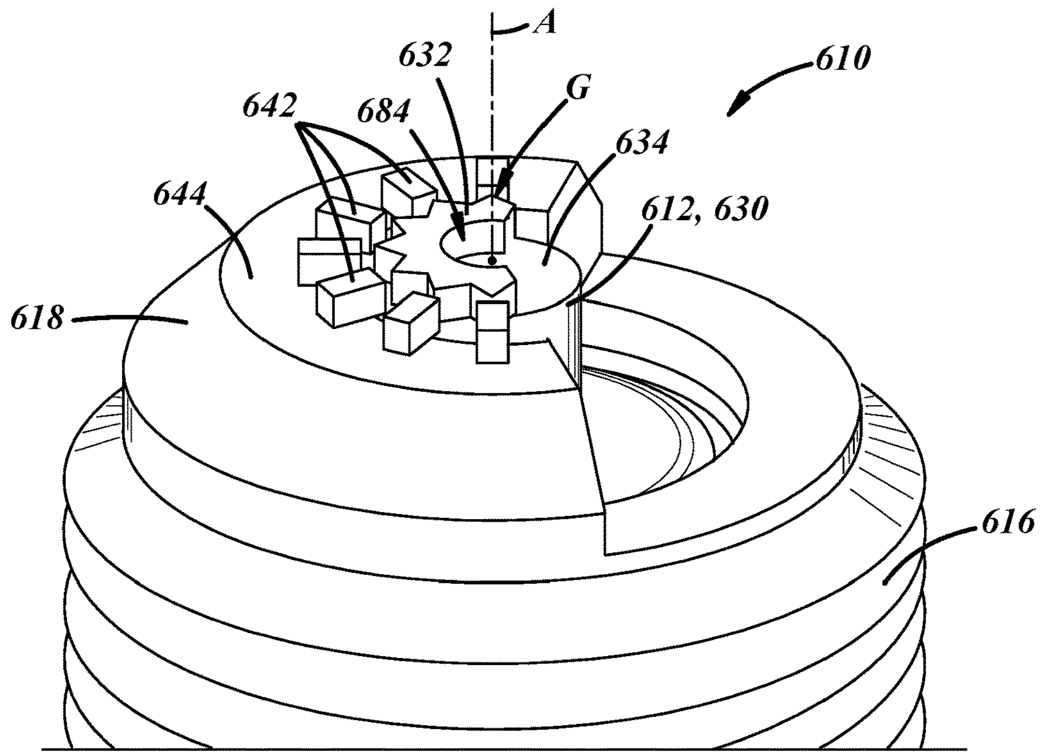
FIGS. 14-15 are enlarged, cutaway perspective and cross-sectional views, respectively, of another example of a firing end that may be used with the spark plug in FIG. 1, where the electrode base and the electrode tip of the ground electrode, as well as the electrode tip of the center electrode, have different configurations than those shown in FIGS. 2 and 3.
Figure 15:
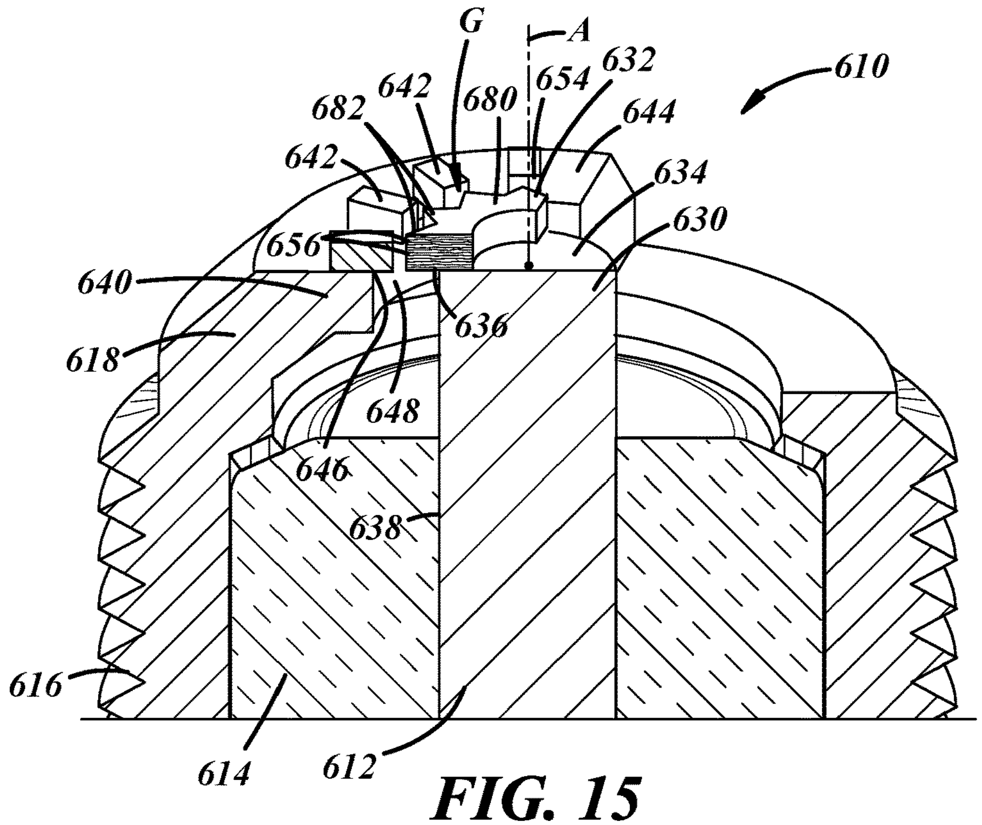

Another example of a spark plug 610 is shown in FIGS. 14-15, where the spark plug includes a center electrode 612 with an electrode base 630, an insulator 614, a metallic shell 616, and a ground electrode 618 with an electrode base 640. This example combines certain features from previous examples and also provides new features. For example, the ground electrode 618 may be a single component, as opposed to multiple discrete ground electrode components, with an annular electrode base 640 and axial end surface 644 that continuously and circumferentially surrounds the center electrode 612, similar to that shown in FIGS. 6-7. A number of ground electrode tips 642 in the shape of rectangular prisms (i.e., three-dimensional rectangles) or some other shape may be formed on the ground electrode base 640 such that they circumferentially surround a center electrode tip 632. The center electrode tip 632 is shown in the shape of an annular star or sun that is built upon an axial end surface 634 of the center electrode base 630 and includes an annular center portion 680 and a number of sparking portions 682 extending from the annular center portion. The sparking portions 682 are shown as pointed tips radially extending from the annular center portion 680, but they could be blunted or rounded tips instead. One consequence of pointed sparking portions 682 is that a series of radial spark gaps G are formed between a sparking surface 654 on one side (e.g., ground electrode side) and a sparking site or point 682 on the other side (e.g., center electrode side), as opposed to the spark gap being established between two sparking surfaces. Electrode tip 632 extends beyond and overhangs an edge 636 at the intersection of side and axial end surfaces 638, 634 of the center electrode 612, whereas electrode tips 642 extend beyond and overhang an edge 646 formed at the intersection of side and axial end surfaces 648, 644 of the ground electrode 618. The electrode tips 632, 642 are made from one or more precious metal-based material(s) using an additive manufacturing process and, as such, they include a collection of laser deposition layers 656 that are built on top of one another in a layer-by-layer arrangement. In this particular example, the center electrode tip 632 is annular or ring-shaped so that the center of the tip has a hollow portion or opening 684, thus, reducing the amount of expensive precious metal-based material. The spark plug 610 has twelve ground electrode tips 642 (cutaway views do not show all of them) that are circumferentially separated or spaced from one another by about 30° around the center axis A. Of course, a different number or arrangement of center and/or ground electrode tips could be used instead. If spark plug 610 is used in an application with asymmetric gas flow and/or an asymmetric ignition source, it may be desirable to orient the circumferential position of a thread start of shell 616 to the intended cylinder head and/or control an external gasket thickness. Spark plug 610, with its sharp sparking points 682 that reduce the voltage requirements of the plug, may be particularly well suited for use in engines where low voltages are needed, such as those that burn hydrogen fuel.

Figure 16:
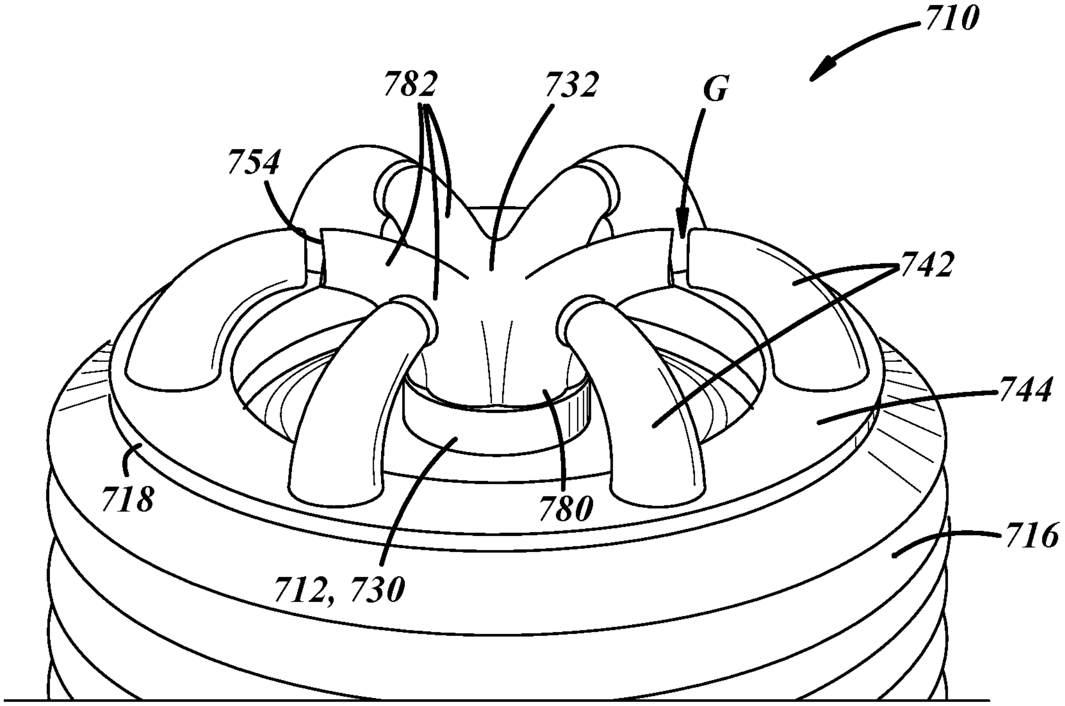
FIGS. 16-17 are enlarged perspective and cross-sectional views, respectively, of another example of a firing end that may be used with the spark plug in FIG. 1, where the electrode base and the electrode tips of the ground electrode, as well as the electrode tip of the center electrode, have different configurations than those shown in FIGS. 2 and 3.
Figure 17:
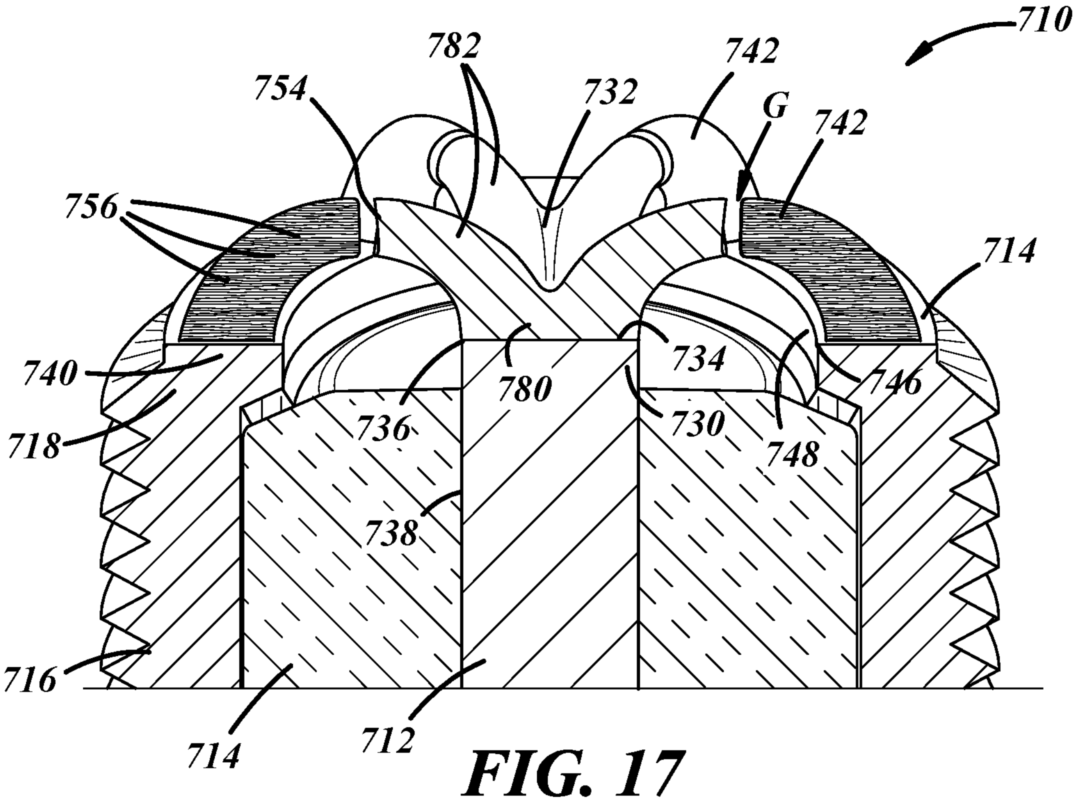

Turning now to FIGS. 16-17, there is shown another potential embodiment of a spark plug 710 that includes a center electrode 712 with an electrode base 730, an insulator 714, a metallic shell 716, and a ground electrode 718 with an electrode base 740. The center electrode 712 is shown as a standard cylindrical electrode component and the ground electrode 718 is shown as a single or unitary annular electrode component, however, these electrodes could be provided according to any of the embodiments disclosed herein, as well as other suitable embodiments known in the art. A center electrode tip 732 is built on an axial end surface 734 of the center electrode base 730 in the shape of a fountain with multiple spouts and, according to this example, has a center portion 780 and a number of sparking portions 782 extending therefrom. The center portion 780 may be a cylindrical or disk-shaped component with an outer diameter that is the same as the underlying center electrode base 730 such that a flush or nearly flush interface is established at the junction of the two components. Each of the sparking portions 782 is a curved extension or tube that extends axially upward and away from the center portion 780 and radially outward towards a corresponding ground electrode tip such that, together, the sparking portions 782 form a sort of burst pattern. Because of the additive manufacturing process that makes these tips on a layer-by-layer basis, a significant amount of design freedom is afforded that enables such shapes. In this particular example, each of the sparking portions 782 extends in a curved or bowed manner that avoids sharp transitions along its length and terminates in a flat or slightly curved sparking surface 754. The center electrode tip 732 and, more particularly, the sparking portions 782 overhang an edge 736 that is located at the intersection of side and axial end surfaces 738, 734, respectively, of the center electrode 712. In this case, the center electrode tip 732 overhangs the edge 736, even though it forms a flush interface with the center electrode base 730, which is different than the embodiments previously discussed. A number of individual ground electrode tips 742 are built on the ground electrode base 740 and extend towards their center electrode counterparts such that a series of radial spark gaps G are formed between opposing sparking surfaces. Each of the ground electrode tips 742 may be provided in the form of a solid curved tube that resembles that of sparking portions 782 (e.g., they may be mirror images) and curves up and away from the ground electrode base 740. Each ground electrode tip 742 overhangs an edge 746 formed at an intersection of side and axial end surfaces 748, 744 of the ground electrode, even though it forms a flush or nearly flush interface with the ground electrode base 740. In this particular example, there are six sparking portions 782 and six ground electrode tips 742 forming six electrode tip pairs, where each electrode tip pair is spaced approximately 60° from an adjacent pair. The electrode tips 732, 742 are made from one or more precious metal-based material(s) using an additive manufacturing process and, as such, they include a collection of laser deposition layers 756 that are built on top of one another in a layer-by-layer arrangement. As mentioned above, it is possible to also make the electrode tips 732, 742 from a non-precious metal-based material, like a nickel-based material.

Figure 18:
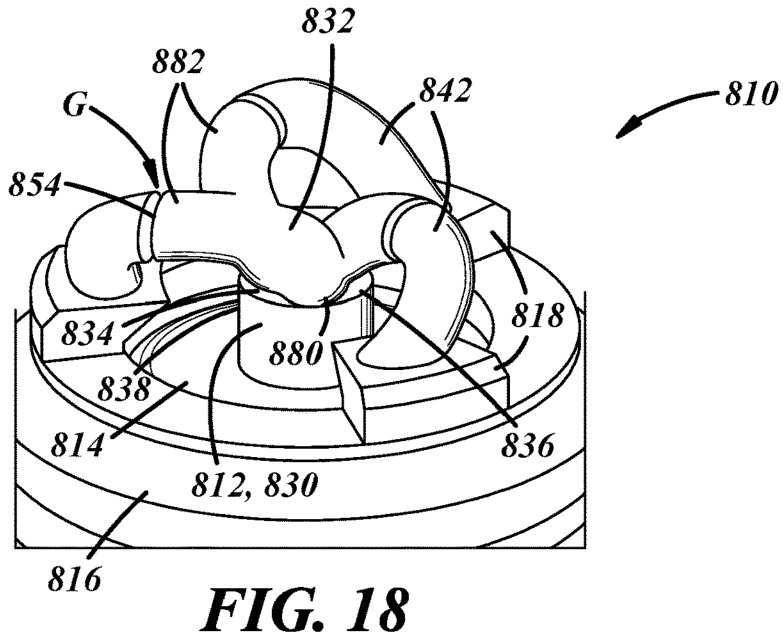
FIGS. 18-20 are enlarged perspective, end and side views, respectively, of another example of a firing end that may be used with the spark plug in FIG. 1, where the electrode base and the electrode tips of the ground electrode, as well as the electrode tip of the center electrode, have different configurations than those shown in FIGS. 2 and 3.
Figure 19:
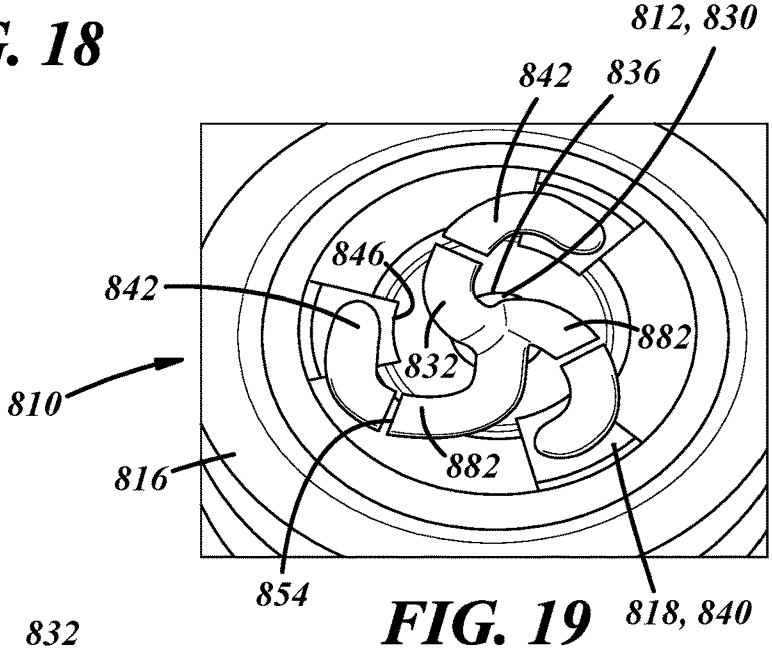
Figure 20:
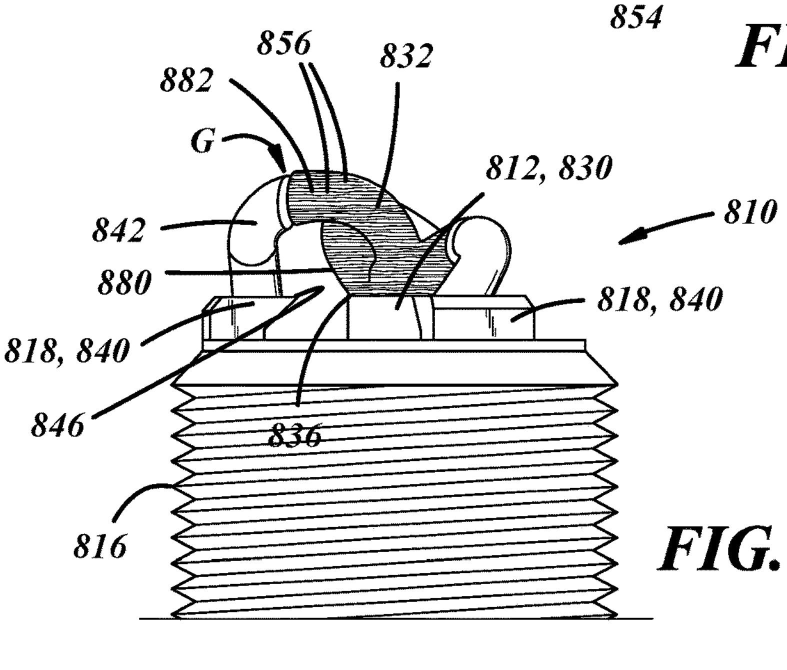

FIGS. 18-20 illustrate another embodiment of a spark plug 810 that has a center electrode 812 with an electrode base 830, an insulator 814, a metallic shell 816, and several ground electrodes 818 each with an electrode base 840. The center electrode tip 832 and ground electrode tips 842 in this example are in the shape of curved extensions or tubes, similar to the last embodiment, except that these components may have a more complex corkscrew, spiral and/or helical shape where they are curved in three dimensions, whereas electrode tips 732, 742 may be curved in two dimensions, although this is not required. Center electrode tip 832 is built on an axial end surface 834 of the center electrode base 830 and, according to one possibility, includes a center portion 880 with a number of sparking portions 882 extending therefrom in a spiraling or corkscrewing fashion, somewhat akin to tree trunks growing out of a common base. The center portion 880 may have a cross-section that is in the shape of several round lobes merged together, as shown, or it may simply have a circular or oval shaped cross-section. It is possible for the center portion 880 to have a smaller outer diameter or perimeter than that of the corresponding center electrode base 830 such that the center electrode tip 832 is somewhat recessed from an edge 836 of the center electrode 812, thereby resulting in an interface that is not flush. The edge 836 is formed at the boundary of side and axial end surfaces 838, 834, respectively. The center electrode tip 832, with its spiraling tube-shaped sparking portions 882, can extend axially upward and radially outward such that sparking surfaces 854 located at distal ends of sparking portions 882 overhang the edge 836 and form part of a radial spark gap G. As with previous embodiments, sparking portions 832, 842 are preferably solid, as opposed to being hollow. Ground electrode tips 842 are built on ground electrode bases 840 that may be part of discrete or separate ground electrodes 818, although its possible for this embodiment to have a single annular ground electrode, like that shown in the previous embodiment. Each of the ground electrode tips 842 is set back or recessed from an edge 846 of the ground electrode and extends out over the edge 846. The spark plug of this example has three sparking portions 882 and three ground electrode tips 842 forming three electrode tip pairs, where each electrode tip pair is spaced approximately 120° from an adjacent pair. The electrode tips 832, 842 are made from one or more precious metal-based material(s) using an additive manufacturing process and, as such, they include a collection of laser deposition layers 856 that are built on top of one another in a layer-by-layer arrangement.

Figure 21:
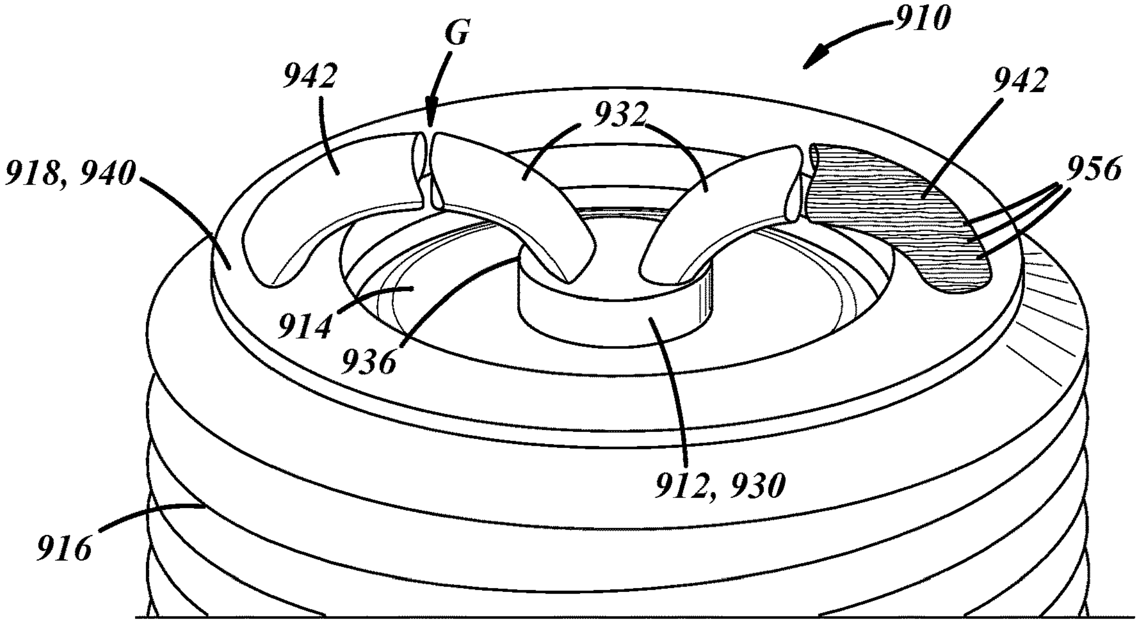
FIGS. 21-22 are enlarged perspective and end views, respectively, of another example of a firing end that may be used with the spark plug in FIG. 1, where the electrode base and the electrode tips of the ground electrode, as well as the electrode tip of the center electrode, have different configurations than those shown in FIGS. 2 and 3.
Figure 22:
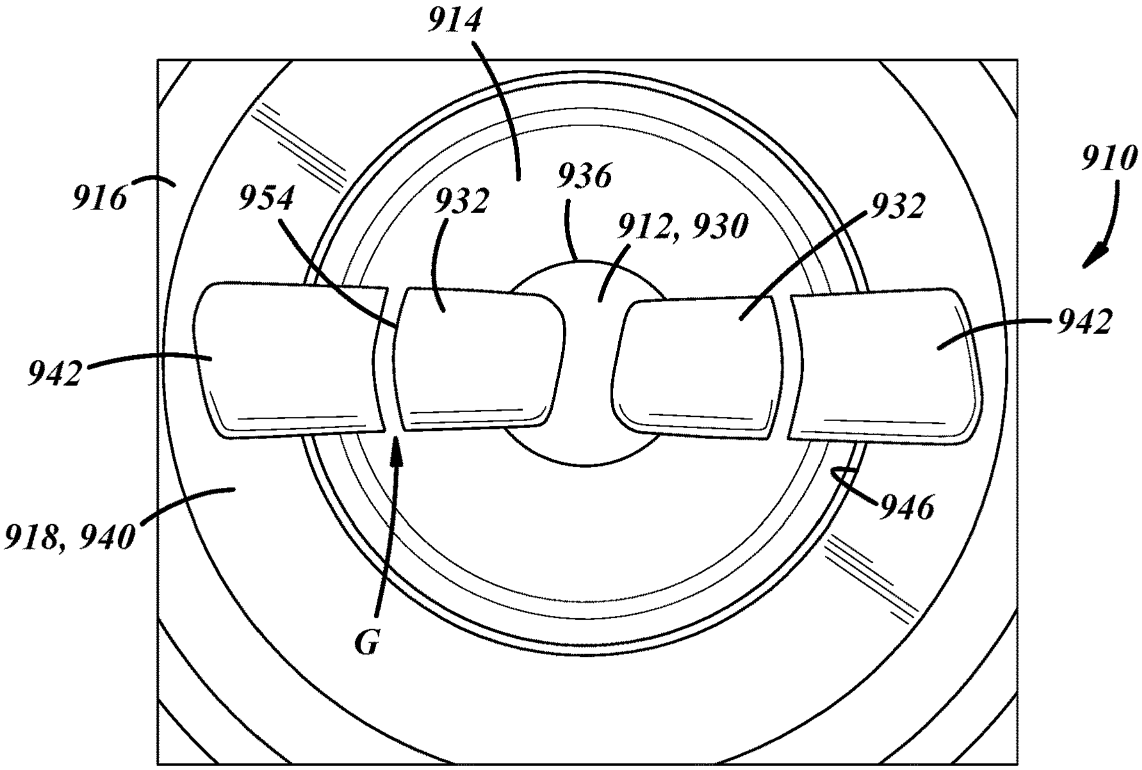

In FIGS. 21-22, there is shown yet another embodiment of a spark plug 910 having a center electrode 912 with an electrode base 930, an insulator 914, a metallic shell 916, and an annular ground electrode 918 with an electrode base 940. According to this example, the center electrode 912 includes multiple center electrode tips 932, each of which is built on the electrode base 930 and extends in a semi-arcuate fashion such that it forms a partial arch that overhangs an edge 936 of the center electrode. At a distal end of each of the center electrode tips 932 is a sparking surface 954 that can be curved, as shown, or flat and helps establish a radial spark gap G. Extending from the ground electrode 918, are several ground electrode tips 942, each of which may be configured in a semi-arcuate partial arch shape that complements the corresponding center electrode tip 932 such that, together they form a completed arch with the radial spark gap G in the middle. Each ground electrode tip 942 overhangs an edge 946 of the ground electrode and includes a curved or flat sparking surface of its own. The illustrated embodiment shows two center electrode tips 932 and two ground electrode tips 942 for a total of two electrode tip pairs separated from one another by about 180°, however, more or less electrode tip pairs could be provided instead. One possible attribute of this embodiment is that the geometry of the electrode tip pairs may guide and promote an optimized gas flow, similar to that of an airplane wing. The electrode tips 932, 942 are made from one or more precious metal-based material(s) using an additive manufacturing process and include a number of laser deposition layers 956 that are built on top of one another in a layer-by-layer arrangement such that they are generally perpendicular to a center axis of the plug.

Figure 23:
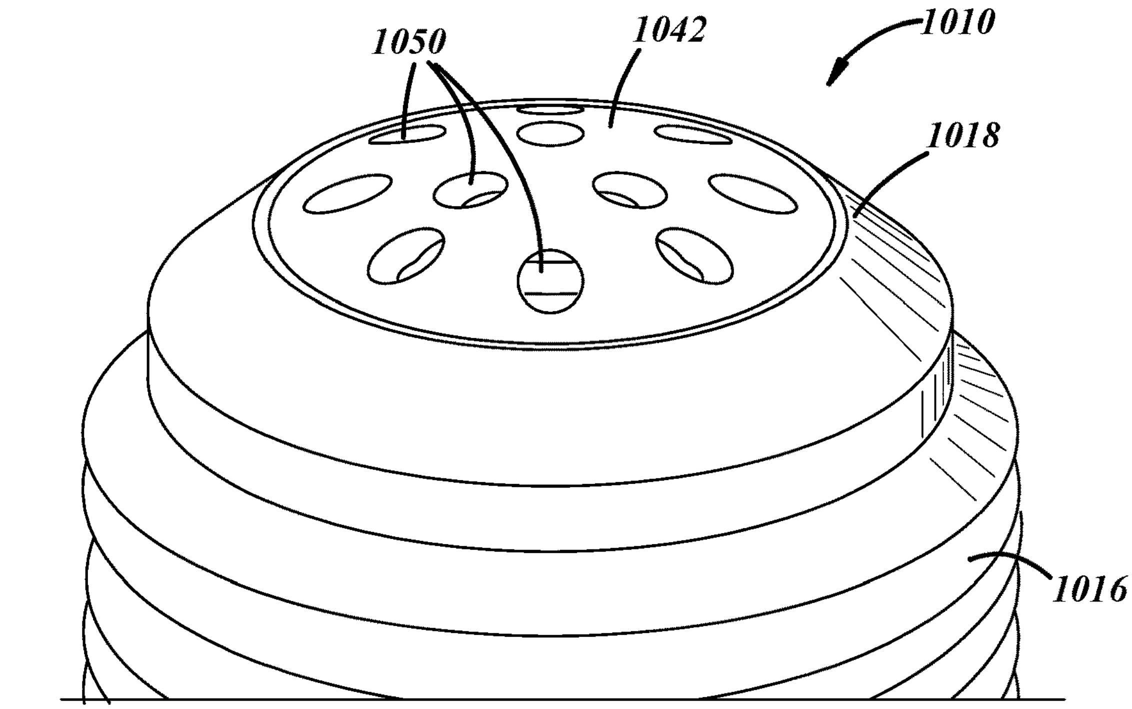
FIGS. 23-24 are enlarged perspective and cross-sectional views, respectively, of another example of a firing end that may be used with the spark plug in FIG. 1, where the electrode base and the electrode tip of the ground electrode, as well as the electrode tip of the center electrode, have different configurations than those shown in FIGS. 2 and 3.
Figure 24:
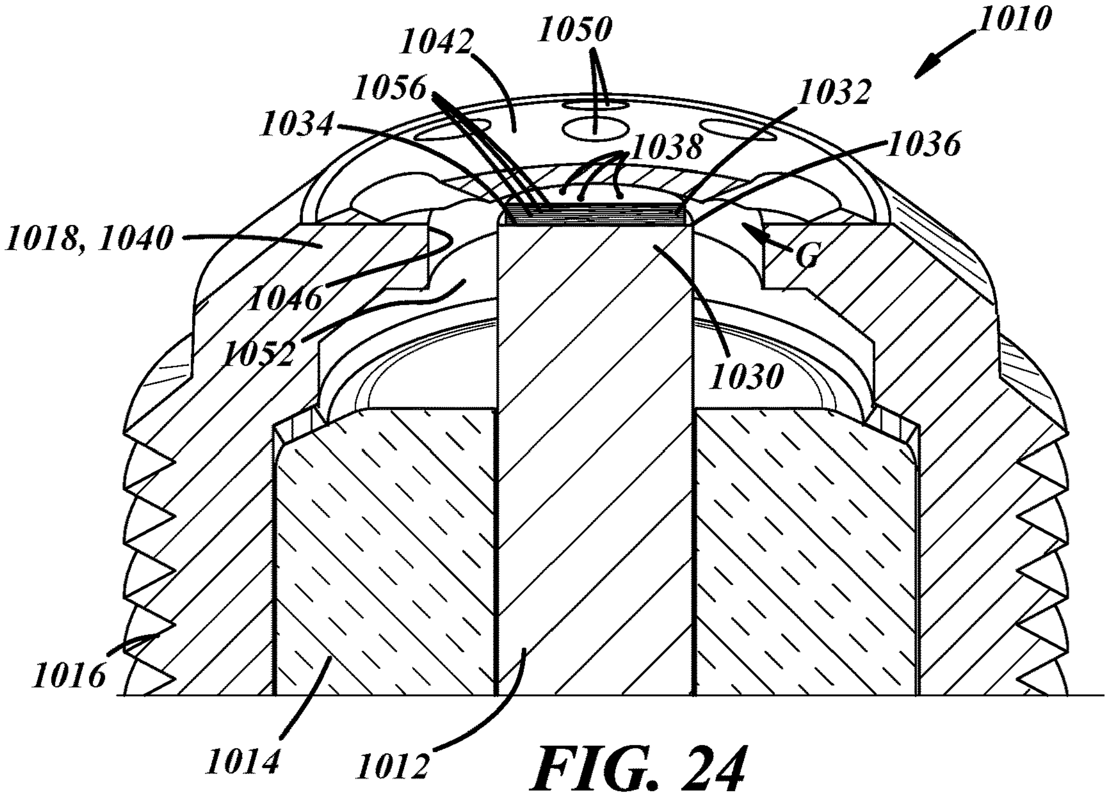

With reference now to FIGS. 23-24, there is shown an embodiment of a spark plug 1010 with a center electrode 1012 having an electrode base 1030, an insulator 1014, a metallic shell 1016, and an annular ground electrode 1018 having an electrode base 1040. The center electrode 1012 includes a disk-shaped center electrode tip 1032 that, according to one possibility, has a number of sparking portions or sparking sites 1038 that axially rise up from the electrode tip and point towards a dome-shaped ground electrode tip 1042. The sparking sites 1038 can be conical with pointed ends, they can be columnar with flat blunted ends, they can be semi-spherical or oval with rounded ends, or they can be provided according to some other configuration. Since the center electrode tip 1032 is built onto the center electrode base 1030 via an additive manufacturing or 3D printing process, there are numerous possible configurations. In one example, the sparking sites 1038 are arranged according to rows and/or columns so that a matrix or grid-like pattern of such sites is formed on and completely covers an axial end surface 1034 of the center electrode base 1030. Although not shown, it is possible for the center electrode tip 1032 to have an overhanging configuration such that the tip at least partially overhangs a circumferential edge 1036 of the center electrode 1012. The ground electrode tip 1042 is shown here as a single or unitary dome-shaped component that is circumferentially connected to the annular ground electrode base 1040 and includes a number of openings or ports 1050 that allow an air/fuel mixture to enter and allow burnt gases and combustion flames to exit. In this way, the ground electrode tip 1042 forms a prechamber 1052 of sorts that is in communication, via the ports 1050, with a main combustion chamber. The ground electrode tip 1042 overhangs a circumferential edge 1046 of the ground electrode such that an axial spark gap G is primarily established. The electrode tips 1032, 1042 may be made from one or more precious metal-based material(s) using an additive manufacturing process and may include a number of laser deposition layers 1056 that are built on top of one another in a layer-by-layer arrangement. As with all of the embodiments disclosed herein, both center and ground electrode tips may include laser deposition layers resulting from an additive manufacturing process, even if they are not specifically shown in the drawings.

The preceding examples represent just some of the possible configurations and embodiments of the spark plug and spark plug electrode of the present application. For instance, it is possible to provide a spark plug and/or a spark plug electrode, including any of the examples shown in FIGS. 1-24, with any feasible combination of the following features:

- a center electrode with one or more electrode tip(s) that overhangs an edge of the center electrode and a ground electrode with one or more electrode tip(s) that overhangs an edge of the ground electrode (e.g., see FIGS. 1-3, FIGS. 4-5, FIGS. 6-7, FIGS. 8-9, FIGS. 14-15, FIGS. 16-17, FIGS. 18-20, FIGS. 21-22);
- a center electrode with electrode tip(s) that overhangs an edge of the center electrode and a ground electrode with electrode tip(s) that is flush with or retracted from an edge of the ground electrode (e.g., see FIGS. 12-13);
- a center electrode with electrode tip(s) that is flush with or retracted from an edge of the center electrode and a ground electrode with electrode tip(s) that overhangs an edge of the ground electrode (e.g., see FIGS. 10-11, FIGS. 23-24);
- a center electrode and/or a ground electrode with four or more separate electrode tips (e.g., see FIGS. 1-3, FIGS. 4-5, FIGS. 6-7, FIGS. 14-15, FIGS. 16-17);
- a center electrode and/or a ground electrode with a single annular or disk-shaped electrode tip (e.g., see FIGS. 6-7, FIGS. 8-9, FIGS. 10-11, FIGS. 14-15, FIGS. 23-24);
- a center electrode and/or a ground electrode with one or more electrode tip(s) that has a flat or planar sparking surface (e.g., see FIGS. 1-3, FIGS. 4-5, FIGS. 6-7, FIGS. 8-9, FIGS. 10-11, FIGS. 14-15, FIGS. 16-17, FIGS. 18-20);
- a center electrode and/or a ground electrode with one or more electrode tip(s) that has a curved, cylindrical, concave, convex or other contoured sparking surface (e.g., see FIGS. 6-7, FIGS. 8-9, FIGS. 10-11, FIGS. 12-13, FIGS. 21-22, FIGS. 23-24);
- a center electrode and/or a ground electrode with one or more electrode tip(s) that has a pointed or sharp sparking surface (e.g., see FIGS. 14-15, FIGS. 23-24);
- a center electrode and/or a ground electrode with one or more electrode tip(s) that has a chamfered or rounded non-sparking surface (e.g., see FIGS. 4-5, FIGS. 8-9, FIGS. 10-11, FIGS. 12-13);

- a center electrode and/or a ground electrode with one or more electrode tip(s) that has a first sparking surface that is aligned in an axial direction and a second sparking surface that is angled or curved with respect to the axial direction (e.g., see FIGS. 10-11);
- a center electrode and/or a ground electrode with one or more electrode tip(s) that is in the shape of a three-dimensional rectangle, triangle, polygon, wedge, ring, star, block, rivet, cylinder, bar, column, wire, ball, mound, cone, flat pad, disk, plate, ring, sleeve, fountain, curved tube, corkscrewing, spiral and/or helical tube, arch, dome, matrix and/or other shape (e.g., see FIGS. 1-3, FIGS. 4-5, FIGS. 6-7, FIGS. 8-9, FIGS. 10-11, FIGS. 12-13, FIGS. 14-15, FIGS. 16-17, FIGS. 18-20, FIGS. 21-22, FIGS. 23-24);
- a center electrode with one or more electrode tip(s) that has a sparking surface and a ground electrode with one or more electrode tip(s) that has a sparking surface, where the sparking surfaces of the center electrode and the ground electrode are parallel to one another or complementarily curved across a radial spark gap that is uniform (e.g., see FIGS. 1-3, FIGS. 4-5, FIGS. 12-13, FIGS. 16-17, FIGS. 18-20, FIGS. 21-22);
- a center electrode with one or more electrode tip(s) that has a sparking surface and a ground electrode with one or more electrode tip(s) that has a sparking surface, where the sparking surfaces of a first electrode tip pair create a first radial spark gap of a first dimension, the sparking surfaces of a second electrode tip pair create a second radial spark gap of a second dimension, and so on;
- a center electrode and/or a ground electrode with one or more electrode tip(s) that has a constant cross-section along the axial height of the electrode tip(s) (e.g., see FIGS. 1-3, FIGS. 6-7, FIGS. 8-9, FIGS. 10-11, FIGS. 12-13, FIGS. 14-15);
- a center electrode and/or a ground electrode with one or more electrode tip(s) that has a non-constant or changing cross-section along the axial height of the electrode tip(s) (e.g., see FIGS. 4-5, FIGS. 8-9, FIGS. 10-11, FIGS. 12-13, FIGS. 16-17, FIGS. 18-20, FIGS. 21-22, FIGS. 23-24);
- a center electrode with one or more electrode tip(s) and a ground electrode with one or more electrode tip(s), where all of the center electrode tip(s) and the ground electrode tip(s) are made from the same precious metal-based material; and
- a center electrode with one or more electrode tip(s) and a ground electrode with one or more electrode tip(s), where at least one of the center electrode tips is made from a different precious metal-based material than a ground electrode tip.

The following description of an electrode base may apply to any of the center and/or ground electrode bases 30, 40, 130, 140, 230, 240, 330, 340, 430, 440, 530, 540, 630, 640, 730, 740, 830, 840, 930, 940, 1030, 1040, 1530, 1540 disclosed herein. The electrode base may be part of a ground electrode that is a separate piece or component that is welded, additive manufactured, or otherwise attached to the shell, or the electrode base may be part of a ground electrode that is a unitary or continuous extension of the shell. In either case, the electrode base is the part of the spark plug on which the electrode tip is formed by additive manufacturing and, thus, can act as a carrier material for the electrode tip. The same applies to the center electrode. The electrode base can be manufactured by drawing, extruding, machining, casting and/or using some other conventional process and may be made from a nickel-based material (e.g., when it is a separate piece from the shell) or an iron-based material (e.g., when it is an integral part of the shell). The term "nickel-based material," as used herein, means a material in which nickel is the single largest constituent of the material by weight, and it may or may not contain other constituents (e.g., a nickel-based material can be pure nickel, nickel with some impurities, or a nickel-based alloy). According to one example, the electrode base is made from a nickel-based material having a relatively high weight percentage of nickel, such as a nickel-based material comprising 98 wt % or more nickel. In a different example, the electrode base is made from a nickel-based material having a lower weight percentage of nickel, like a nickel-based material comprising 50-90 wt % nickel (e.g., INCONEL™ 600 or 601). One particularly suitable nickel-based material has about 70-80 wt % nickel, 10-20 wt % chromium, 5-10 wt % iron, as well as other elements in smaller quantities. The term "iron-based material," as used herein, means a material in which iron is the single largest constituent of the material by weight, and it may or may not contain other constituents (e.g., an iron-based material can be a suitable type of steel, such as various carbon steels (e.g., 1.0503-C45, 1.0401-C15, grade 5140, etc.), stainless steels (e.g., 1.4571), etc.). Other materials, including those that are not nickel- or iron-based, and other sizes and shapes may be used for the electrode base instead.

The following description of an electrode tip may apply to any of the center and/or ground electrode tips 32, 42, 132, 142, 232, 242, 332, 342, 432, 442, 532, 542, 632, 642, 732, 742, 832, 842, 932, 942, 1032, 1042, 1532, 1542 disclosed herein. The electrode tip is the section or portion of the electrode, usually the sparking portion, that is formed on the electrode base by additive manufacturing. As such, the electrode tip may be made from a bed of precious metal-based powder that is brought into close proximity with the electrode base so that, when irradiated by a laser or electron beam, the precious metal-based powder and some of the solid material of the electrode base are melted and solidify into laser deposition layers 56, 156, 256, 356, 456, 556, 656, 756, 856, 956, 1056. This process of creating individual layers is repeated, thereby creating a number of laser deposition layers that are sequentially built or stacked on one another such that the layers are perpendicular to the center axis A of the spark plug (being "perpendicular" in this context does not require perfect perpendicularity, so long as the laser deposition layers are, when viewed in cross-section, perpendicular to center axis A within a tolerable margin of error). Some laser deposition layers may only have material from the electrode base and the electrode tip; while other layers may only have material from the electrode tip. As illustrated in the enlarged inset in FIG. 2, each laser deposition layer has an average layer thickness T, which may be between 5 μm and 60 μm, and the total or sum of all of the layer thicknesses is the electrode tip height Z, which may be between 0.05 and 3.0 mm, or even more preferably between 0.1 and 2.0 mm. By connecting or joining the electrode tip to the electrode base across the entire footprint of the electrode tip, not just around the outer circumference of the electrode tip (which is typically the case with laser welds), a "whole area connection" between the electrode tip and electrode base can be created.

The electrode tip may be made from a precious metal-based material so as to provide improved resistance to corrosion and/or erosion. The term "precious metal-based material," as used herein, means a material in which a precious metal is the single largest constituent of the material by weight, even if the precious metal is not greater than 50 wt % of the overall material so long as it is the single largest constituent, and it may or may not contain other constituents (e.g., a precious metal-based material can be pure precious metal, precious metal with some impurities, or a precious metal-based alloy). Precious metal-based materials that may be used include iridium-, platinum-, ruthenium- palladium-, gold- and/or rhodium-based materials, to cite a few possibilities. According to one example, the electrode tip is made from an iridium- or platinum-based material, where the material has been processed into a powder form so that it can be used in the additive manufacturing process. As mentioned above, certain precious metals, like iridium, can be very expensive, thus, it is typically desirable to reduce the content of such materials in the electrode tip, so long as doing so does not unacceptably degrade the performance of the electrode tip. Precious metal-based powders with no more than 60 wt % iridium (e.g., Pt—Ir40, Pt—Ir50, Ir—Pt40, etc.), and preferably with no more than 50 wt % iridium (e.g., Pt—Ir40, Pt—Ir50, etc.), may be suitable for certain applications, as such materials can strike a desirable balance between cost and performance. In some embodiments, such as those shown in FIGS. 16-24, where the electrode tips are large components requiring a substantial amount of material to form them, it may not be economically feasible to make the entire electrode tip structure from a precious metal-based material. In some instances, depending on the current prices of precious metals, it may not be economically feasible to make any electrode tip structures, including those in FIGS. 1-15, from a precious metal-based material. In such cases, it may be preferable to make all or part of the electrode tip from a different material that is not a "precious metal-based material," such as one having at least 5 wt % of a precious metal, a melting temperature of at least 1700° C., and a density of at least 14.0 g/cm$^3$. In one example, a nickel-based or other material could be used to form a section or portion of the electrode base and then a precious metal-based material could be added (either by additive manufacturing or by conventional welding or other techniques) just at the firing end or sparking surface. Accordingly, it is not required that a precious metal-based material be used, as any electrode tip embodiment disclosed herein may include or be made, in whole or in part, with a material that is not a precious metal-based material, including ones having at least 5 wt % of a precious metal, nickel-based materials, etc. Other non-precious metal-based materials are certainly possible and may be used as well.

Figure 25:
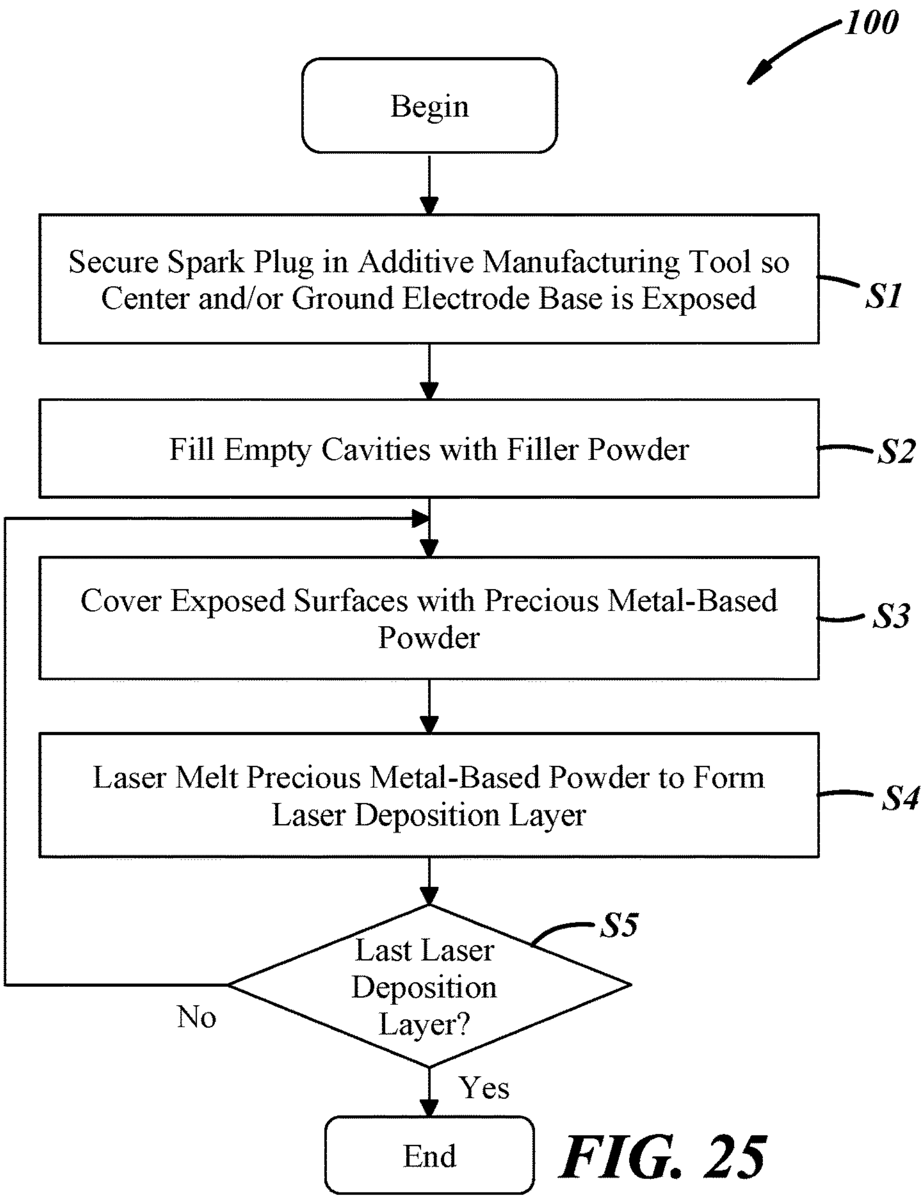
FIG. 25 is a flowchart of an additive manufacturing process that may be used with the various spark plug examples shown in FIGS. 1-24 to form one or more precious metal-based electrode tip(s) on one or more electrode base (s)
Figure 26:
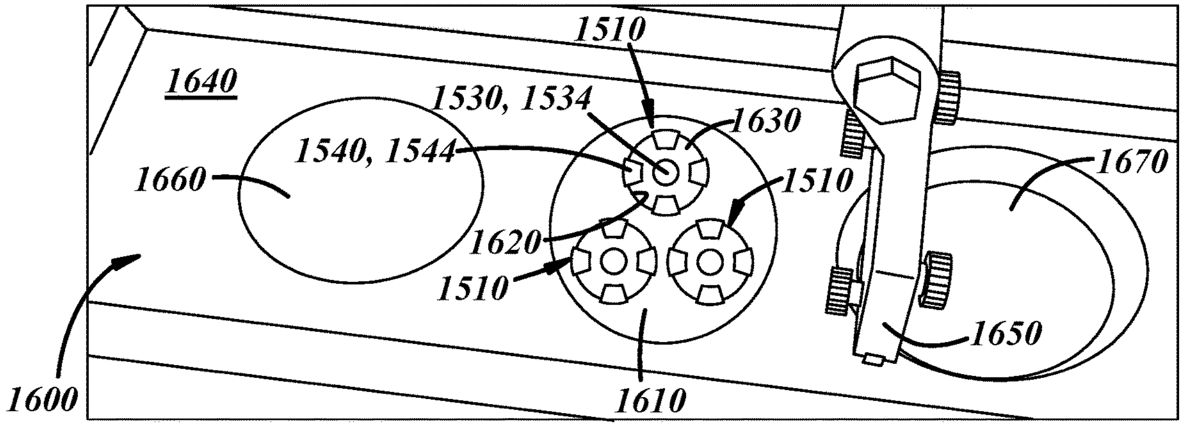
FIG. 26 shows a portion of a piece of manufacturing equipment that may be used with the additive manufacturing process of FIG. 25.
Figure 27:
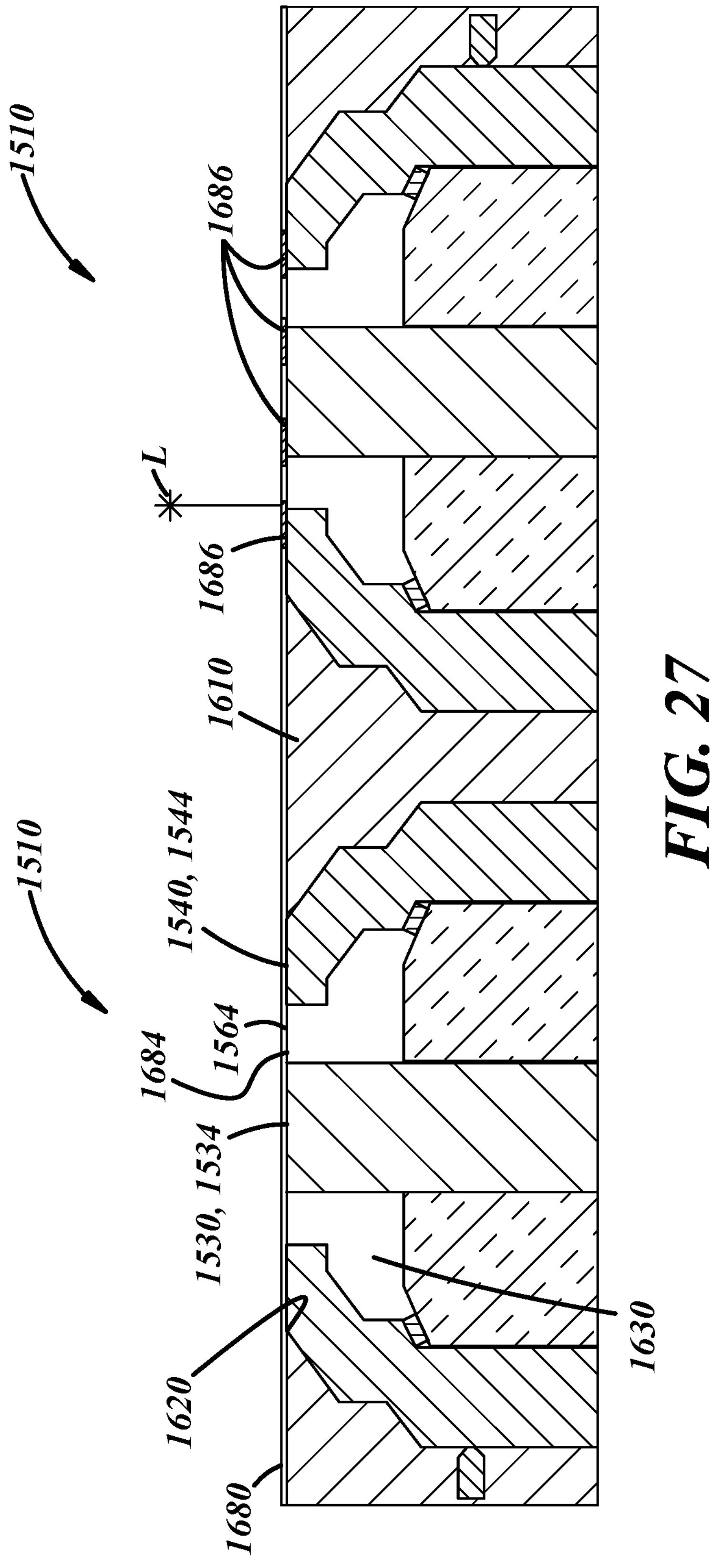
FIG. 27 shows a cross-sectional view of the piece of manufacturing equipment from FIG. 26 with two example spark plugs mounted therein.

With reference to FIGS. 25-27, there is provided a description of an additive manufacturing process 100 (sometimes referred to as a 3D printing process) that may be used to create the spark plug and/or spark plug electrode described herein. According to this example, additive manufacturing process 100 uses a powder bed fusion technique to form one or more electrode tip(s) on one or more electrode base(s), as described below. In the following description, electrode tips are simultaneously formed on the center and ground electrodes using the same precious metal-based powder. It should be recognized, however, that the use of two or more precious metal-based powders is also possible (e.g., through the use of laser deposition welding with a powder nozzle or by forming electrode tips on the center and ground electrodes during separate forming steps). Non-limiting examples of suitable powder bed fusion techniques include selective laser melting (SLM), selective laser sintering (SLS), direct metal laser sintering (DMLS), and electron beam melting (EBM), to name a few. Additive manufacturing process 100 may be used with any of the embodiments and examples taught herein, as well as others, and is not limited to the following example.

Starting with step S1, a spark plug 1510 is secured or mounted in an additive manufacturing tool 1600 such that a center electrode base 1530 and/or a ground electrode base 1540 is exposed. At the time it is secured, the spark plug 1510 may be an entire, assembled spark plug or just certain portions or components thereof, such as center and/or ground electrodes. In the illustrated example, several spark plugs 1510 are mounted or installed in a substrate plate 1610 of the additive manufacturing tool 1600 (e.g., the shell of spark plug 1510 can be screwed into corresponding threads of substrate plate 1610 or some other jig) such that the spark plugs are supported in a generally vertical orientation. The substrate plate 1610, also known as a build plate, is shown as a circular plate with three circular cutouts or openings 1620, one for each of three spark plugs 1510, but other embodiments with different numbers and/or shapes of cutouts are certainly possible (e.g., rectangular or square substrate plates). The substrate plate 1610 supports the spark plugs 1510 such that axial end surfaces 1534 and 1544 of the center and ground electrode bases 1530 and 1540, respectively, are facing upwards and are exposed. The axial end surfaces 1534, 1544 may be flush with or slightly recessed from the upper surface of the substrate plate 1610, as best illustrated in FIG. 27.

Next, the additive manufacturing process fills any empty cavities or spaces within the cutouts 1620 with a filler material 1630, step S2. The filler material 1630 is simply intended to fill in any empty spaces located within the interior of the spark plug 1510 such that a temporary floor or base 1564 is provided, upon which electrode tips can be at least partially built. Step S2 may add filler material 1630 to the basin or sink 1640 and then sweep a wiper blade 1650 across the filler material to fill in the empty spaces or cavities in the spark plug. The height of the wiper blade 1650 may be set so that it is even with the exposed surfaces of the basin 1640, the substrate plate 1610 and/or the axial end surface 1534, 1544 of the electrodes. This causes the filler material 1630 to fill in and occupy the empty spaces within the interior of the spark plug 1510, such as those between the shell or ground electrodes and the center electrode, such that a flush surface 1564 is established across the top of the substrate plate 1610. In different examples, step S2 may be carried out manually by an operator or the step may even be performed before the spark plugs 1510 are installed in the additive manufacturing tool 1600. One advantage is that the ceramic surface of the insulator remains free of metallic particles that may have to be removed later. Following step S2, the upper surfaces of the substrate plate 1610, the center and ground electrode bases 1530, 1540, and the temporary floor 1564 may all be flush with one another so as to establish a single flat surface. In one example, the filler material 1630 is the same precious metal-based powder that is later used to build the electrode tips. In a different example, the filler material 1630 is a salt (e.g., NaCl or some other salt) that pours easily, has a high melting point, protects the insulator from metallic particles, can form a glass-like surface at floor 1564 that prevents precious metal-based powder from migrating down into the interior spaces, and due to its solubility in water can be easily separated from the precious metal-based powder without leaving a residue. If a salt or other non-precious metal-based filler material is used, it is preferable that the filler material 1630 have a larger average grain size (e.g., 40-65 μm) than the precious metal-based powder (e.g., 5-30 μm) so that the two materials can be easily separated with filters or the like. In a different example, the filler material includes a ceramic material (e.g., ceramic spheres such as those made of aluminum oxide) or a glass beads that can be separated by sieving.

Next, the exposed surfaces of the substrate plate 1610, the center and ground electrode bases 1530, 1540, and the temporary floor 1564 are covered with a thin powder layer 1680 of precious metal-based material, step S3. In one example, the precious metal-based powder is provided by a storage cylinder 1660, which can be raised by a certain amount to provide an amount of precious metal-based powder that is related to the desired thickness of the laser deposition layer being created (e.g., if a precious metal layer of 0.15 mm is desired, storage cylinder 1660 may be raised by a factor or 2*x* (0.3 mm) to ensure enough powder is provided to fully cover the electrode bases 1530, 1540). The wiper blade 1650 is then swept flush and parallel across the basin or sink 1640 to create a thin, uniform powder layer 1680 on the substrate plate 1610 (not shown in FIG. 26 so as to reveal the underlying spark plug components), which may be slightly sank or recessed from the rest of the basin 1640 (the amount that substrate plate 1610 is recessed corresponds to the desired thickness of the laser deposition layer being created). Excess precious metal-based powder is swept into the overflow container 1670, so that the powder can be recycled and used again. In the areas where the thin powder layer 1680 of precious metal-based material is laid over top of the temporary floor 1564 of filler material, a powder-to-powder interface 1684 may be established. The respective powder materials and/or their grain sizes may be selected such that the powder-to-powder interface 1684 experiences minimal material diffusion where powder from one layer migrates across the interface into the other layer. Any suitable techniques to minimize such material diffusion may be used. It is possible for the present additive manufacturing process to use different precious metal-based materials as it builds the various laser deposition layers, in order to create a gradient composition along the axial extent of the electrode tip. If this is the case, then step S3 would use a first mixture and subsequent steps would use one or more additional mixtures. Step S3 may use any suitable precious metal-based material, including the iridium-, platinum-, ruthenium-, palladium-, gold- and/or rhodium-based materials described herein. In one example, the precious metal-based powder layer 1680 has a thickness of between 5 μm and 60 μm, inclusive. It is also possible for step S3 to use a material with at least 5 wt % of a precious metal, as opposed to using a precious metal-based material. This change in material may be suitable for certain embodiments, like those shown in FIGS. 16-24, that have large electrode tip structures that require lots of material to build, or it may be suitable during certain market conditions, such as when precious metal prices are high.

In step S4, a laser or electron beam is used to melt or at least sinter the thin powder bed layer in the areas where the electrode tips are to be formed so that a laser deposition layer is formed. Any references herein to "lasers" should be understood to broadly include any suitable light or energy source including, but not limited to, electron beams and lasers. The same applies to "laser deposition layers," which broadly includes deposition layers created by any suitable light or energy source including, but not limited to, those created by electron beams and lasers. A laser L can be moved into position over top of one of the spark plugs 1510 and fired so that a resulting laser beam melts or sinters the thin powder bed layer 1680 as the laser traverses or moves across the axial end surfaces 1534, 1544 of the electrode bases 1530, 1540, respectively; this is part of the powder bed fusion process and it may be carried out according to any suitable technique, such as by using digital model data from a 3D model or another electronic data source like a Stereo-Lithography (STL) file. Because electrode bases 1530 and 1540 were presented or exposed and were then covered with a precious metal-based powder 1680, method 100 is able to form electrode tips on both the center and ground electrodes at the same time. That is, method 100 is able to concurrently build or 3D print precious metal-based electrode tips for both the center and ground electrodes, which can have the benefit of improved accuracy in terms of the parallelism of the sparking surfaces and the tolerances of the spark gaps. For example, if method 100 was manufacturing the spark plug 10 in FIGS. 1-3, step S4 could create a laser deposition layer 1686 for each of the four center electrode tips 32 and the four ground electrode tips 42 in the same cycle, which includes areas where tips 32, 42 overhang or extend beyond an edge of an underlying electrode base. If not for the temporary floor 1564, the precious metal-based powder 1680 would just fall into the empty cavities or spaces in the interior of the spark plug and method 100 would not be able to form overhanging or cantilevered electrode tips. The first time step S4 is carried out, an initial laser deposition layer 1686 is formed on each electrode base 1530, 1540. Skilled artisans will appreciate that, depending on the electrode base material, the electrode tip material and/or other operating parameters, the initial laser deposition layer may not have a fully fused combination of electrode tip and electrode base materials. For instance, it may take several cycles and laser deposition layers (e.g., 1-10 laser deposition layers) before enough energy is transferred to the electrode materials to form a sufficient weld pool.

Step S5 determines if the last or final laser deposition layer has been formed. The cycle or sequence of steps S3-S5 is repeated until the method determines that no more laser deposition layers are needed (i.e., the electrode tips have achieved their desired height(s)). If step S5 determines that more laser deposition layers are needed, then the method loops back and repeats steps S3 and S4 so that a new laser deposition layer can be built on top of the previous layer(s). The precise pattern that the laser follows in step S4 of each cycle may change, such as when the electrode tip has a non-constant cross-section. Also, it should be appreciated that on an initial pass or cycle through steps S3-S4, step S3 covers the electrode bases 1530, 1540 of the center and ground electrodes with a thin powder layer 1680 (i.e., the precious metal-based material of the thin powder bed may be in direct contact with the axial ends 1534, 1544 of the center and ground electrodes), and step S4 then melts or sinters the thin powder bed directly into electrode bases 1530, 1540, thereby forming initial laser deposition layers 1686. In subsequent passes or cycles through steps S3-S4, after the initial laser deposition layer 1686 has already been formed, step S3 may apply the thin powder bed so that it covers one or more previously created laser deposition layer(s), as opposed to covering the actual surfaces of the electrode bases 1530, 1540. In this example, step S4 melts or sinters the thin powder bed material into the previously created laser deposition layer(s), as well as possibly into the electrode bases themselves (depending on how thick the previously created laser deposition layer(s) are and how deep the melting or sintering step goes). In both instances (i.e., in the initial pass and in subsequent passes of steps S3-S4), step S3 covers a firing end of the spark plug with a thin powder bed and step S4 melts or sinters the thin powder bed into the firing end.

Since each laser deposition layer is formed first by melting or sintering powder from the thin powder bed and then allowing the material to solidify, it is possible to adjust or modify the composition of the different laser deposition layers by changing the composition of the powder bed along the way. This enables the present electrode to have a tailored or customized composition gradient across the electrode tip that spreads out differences in thermal coefficients of expansion, as opposed to having the full difference of those coefficients experienced at a single inter-layer boundary. For instance, on the second or a later pass through the method, step S3 may cover the firing end with a second mixture of precious metal-based material having a different composition than the first mixture (e.g., the second mixture may have a greater proportion of precious metal-based material), although this is not required. It is also possible to adjust or modulate the energy or power of the laser, as well as other operating parameters, during subsequent passes to control the amount of melting of the electrode materials. For example, more laser power could be used in subsequent passes to re-melt more deep lying or underlying layers and, thus, transfer some of the electrode base or carrier material to the layers that are being subsequently applied. In yet another example, it is possible to provide the thin layer 1680 as a powder-like layer, as a slurry, as a liquid, or as any other suitable mixture containing the desired precious metal-based material.

Once step S5 determines that no additional laser deposition layers are needed (i.e., the electrode tips are fully formed by additive manufacturing), the spark plug or workpiece can be removed from the tool, the filler material can be removed from the spark plug or workpiece, and the method may end. The filler material may then be recycled or reused to manufacture more spark plugs. Skilled artisans will appreciate that the additive manufacturing process just described may be used to manufacture large numbers of electrodes at a time (i.e., batch processing, such as in FIG. 26 where three spark plugs per substrate plate are being worked on simultaneously, and each spark plug includes eight separate precious metal-based electrode tips), as well as various types of electrodes that differ from those shown here. One difference between the spark plug electrode produced according to the aforementioned process is that an overhanging electrode tip is securely fastened to an electrode base without the use of a circumferential or other type of laser weld (i.e., the present electrode has a weldless joint between the electrode tip and base), which is advantageous for a number of reasons, including those described above. In addition, the uniformity of the spark gaps, the parallelism of the sparking surfaces, the dimensional accuracy of the electrode tips, as well as other characteristics can all be improved. This differs from those spark plug electrodes where an electrode tip is welded to an electrode base (e.g., laser and/or resistance welded), as such arrangements typically have a distinct weld joint or weldment, etc.

It is also possible for the electrode tips described herein, as well as any other electrode component created according to an additive manufacturing process, to be manufactured with or without a support structure. One potential support structure that may be used is a tree support, which mimics the structure of an actual tree such that it supports the component being additive manufactured or 3D printed with its trunks and branches. Another possible support structure is a regular or standard support. Once the component has been formed via the additive manufacturing process, the support structure may be kept or removed. In addition, it should be pointed out that in any of the embodiments disclosed herein, the electrode tips or any other electrode component created according to an additive manufacturing process may be formed as a filled solid component or a hollow solid component. In the case of a filled component, it is possible to fill the cavity (e.g., with a copper-based material) in a downstream process. It is also possible to fuse the powder in such a way that a hollow volume body is formed, but the unfused powder remains in the hollow volume body. Other possibilities and embodiments also exist.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the exact size, shape, composition, etc. of a laser deposition layer could vary from the disclosed examples and still be covered by the present application (e.g., micrographs of actual parts could appear substantially different from the illustrated drawings, yet still be covered). All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A spark plug, comprising:

a shell;

an insulator that is at least partially disposed within the shell;

a center electrode that is at least partially disposed within the insulator and includes a center electrode base;

one or more center electrode tip(s) that are formed on the center electrode base;

one or more ground electrode(s) that include one or more ground electrode base(s); and one or more ground electrode tip(s) that are formed on the ground electrode base(s), each center electrode tip opposes one or more ground electrode tip(s) across one or more radial spark gap(s), wherein each of the center electrode tip(s) and each of the ground electrode tip(s) is formed by an additive manufacturing process.

2. The spark plug of claim 1, wherein the one or more center electrode tip(s) include a plurality of center electrode tips that are formed on the center electrode base by the additive manufacturing process such that each center electrode tip includes a plurality of laser deposition layers made from precious metal-based material, and the plurality of center electrode tips are circumferentially spaced from one another.

3. The spark plug of claim 2, wherein each of the plurality of center electrode tips has a three-dimensional rectangular shape with a constant rectangular cross-section along an axial height and a sparking surface, at least a portion of the sparking surface overhangs the center electrode base and opposes one of the ground electrode tip(s) across one of the radial spark gap(s).

4. The spark plug of claim 2, wherein each of the plurality of center electrode tips has a three-dimensional triangular shape with a non-constant rectangular cross-section along an axial height and a sparking surface, at least a portion of the sparking surface overhangs the center electrode base and opposes one of the ground electrode tip(s) across one of the radial spark gap(s).

5. The spark plug of claim 2, wherein each of the plurality of center electrode tips has a three-dimensional polygon shape with a flat sparking surface and an angled sparking surface, at least a portion of the flat sparking surface and/or the angled sparking surface overhangs the center electrode base and opposes one of the ground electrode tip(s) across one of the radial spark gap(s).

6. The spark plug of claim 2, wherein each of the plurality of center electrode tips has a semi-arcuate shape that forms a partial arch and a sparking surface, at least a portion of the sparking surface overhangs the center electrode base and opposes one of the ground electrode tip(s) across one of the radial spark gap(s).

7. The spark plug of claim 1, wherein the one or more center electrode tip(s) includes a single annular center electrode tip that is formed on the center electrode base by the additive manufacturing process such that the single annular center electrode tip includes a plurality of laser deposition layers made from precious metal-based material.

8. The spark plug of claim 7, wherein the single annular center electrode tip has a continuous ring shape and a sparking surface located on an outer radial side, at least a portion of the sparking surface overhangs the center electrode base and opposes the one or more ground electrode tip(s) across the one or more radial spark gap(s).

9. The spark plug of claim 7, wherein the single annular center electrode tip has an annular star or sun shape and a plurality of sparking portions, at least some of the plurality of sparking portions overhang the center electrode base and oppose the one or more ground electrode tip(s) across the one or more radial spark gap(s).

10. The spark plug of claim 1, wherein the one or more center electrode tip(s) includes a single solid disk-shaped center electrode tip that is formed on the center electrode base by the additive manufacturing process such that the single solid disk-shaped center electrode tip includes a plurality of laser deposition layers made from precious metal-based material, the single solid disk-shaped center electrode tip includes a sparking surface, at least a portion of which overhangs the center electrode base and opposes one or more ground electrode tip(s) across the one or more radial spark gap(s).

11. The spark plug of claim 1, wherein the one or more center electrode tip(s) includes a single star-shaped center electrode tip that is formed on the center electrode base by the additive manufacturing process such that the single star-shaped center electrode tip includes a plurality of laser deposition layers made from precious metal-based material, the single star-shaped center electrode tip also includes a plurality of lobe portions extending from a center portion, each of the plurality of lobe portions includes a sparking surface, at least a portion of which overhangs the center electrode base and opposes one of the ground electrode tip(s) across one of the radial spark gap(s).

12. The spark plug of claim 1, wherein the one or more ground electrode tip(s) include a plurality of ground electrode tips that are formed on the one or more ground electrode base(s) by the additive manufacturing process such that each ground electrode tip includes a plurality of laser deposition layers made from precious metal-based material, and the plurality of ground electrode tips are circumferentially spaced from one another.

13. The spark plug of claim 12, wherein each of the plurality of ground electrode tips has a three-dimensional rectangular shape with a constant rectangular cross-section along an axial height and a sparking surface, at least a portion of the sparking surface overhangs one of the ground electrode base(s) and opposes one of the center electrode tip(s) across one of the radial spark gap(s).

14. The spark plug of claim 12, wherein each of the plurality of ground electrode tips has a three-dimensional triangular shape with a non-constant rectangular cross-section along an axial height and a sparking surface, at least a portion of the sparking surface overhangs one of the ground electrode base(s) and opposes one of the center electrode tip(s) across one of the radial spark gap(s).

15. The spark plug of claim 12, wherein each of the plurality of ground electrode tips has a three-dimensional polygon shape with a flat sparking surface and an angled sparking surface, at least a portion of the flat sparking surface and/or the angled sparking surface overhangs one of the ground electrode base(s) and opposes one of the center electrode tip(s) across one of the radial spark gap(s).

16. The spark plug of claim 12, wherein each of the plurality of ground electrode tips has a truncated wedge shape with a sparking surface and a non-sparking surface, the sparking surface is narrower than the non-sparking surface in a circumferential dimension and opposes one of the center electrode tip(s) across one of the radial spark gap(s).

17. The spark plug of claim 1, wherein the one or more ground electrode(s) includes a single annular ground electrode with a single annular ground electrode base, and the one or more ground electrode tip(s) includes a single annular ground electrode tip formed on the single annular ground electrode base by the additive manufacturing process such that the single annular ground electrode tip includes a plurality of laser deposition layers made from precious metal-based material, and the single annular ground electrode tip opposes the one or more center electrode tip(s) across the one or more radial spark gap(s).

18. The spark plug of claim 1, wherein the one or more ground electrode(s) includes a single annular ground electrode with a single annular ground electrode base, and the one or more ground electrode tip(s) includes a single dome-shaped ground electrode tip formed on the single annular ground electrode base by the additive manufacturing process such that the single dome-shaped ground electrode tip includes a plurality of laser deposition layers made from precious metal-based material, and the single dome-shaped ground electrode tip encloses the one or more center electrode tip(s) in a prechamber that includes a plurality of openings to allow for communication with a main combustion chamber.

19. The spark plug of claim 1, wherein each of the center electrode tip(s) and each of the ground electrode tip(s) is made from a precious metal-based material that includes an iridium-based alloy, a platinum-based alloy, a ruthenium-based alloy, a gold-based alloy or a palladium-based alloy.

20. The spark plug of claim 1, wherein each of the center electrode tip(s) and each of the ground electrode tip(s) includes a plurality of laser deposition layers that are formed during the same additive manufacturing process, the plurality of laser deposition layers have an average layer thickness T that is between 5 μm and 60 μm, inclusive, and are perpendicular to a center axis of the spark plug electrode.

21. An additive manufacturing process for manufacturing a spark plug, comprising the steps of:

securing the spark plug in an additive manufacturing tool so that a firing end that has a center electrode base and a ground electrode base is exposed;

filling an empty cavity within the interior of the spark plug with a filler material, the filler material provides a temporary floor;

covering the firing end and the temporary floor with a thin powder layer that includes a precious metal-based material;

directing a laser or an electron beam towards the firing end such that it melts or sinters at least some of the thin powder layer;

allowing the melted or sintered thin powder layer to at least partially solidify into a laser deposition layer; and repeating the covering, directing and allowing steps for a plurality of cycles so that one or more center electrode tip(s) and one or more ground electrode tip(s) are formed, wherein the center electrode tip(s) and the ground electrode tip(s) are formed during the same additive manufacturing process.

* * * * *